(12) United States Patent
Moriya et al.

(10) Patent No.: US 8,560,129 B2
(45) Date of Patent: Oct. 15, 2013

(54) VIBRATION CONTROL DEVICE AND VEHICLE

(75) Inventors: Hideaki Moriya, Mie (JP); Yushi Sato, Mie (JP); Takeo Ito, Mie (JP); Katsuyoshi Nakano, Mie (JP); Yasushi Muragishi, Mie (JP)

(73) Assignee: Sinfonia Technology Co., Ltd., Tokyo (JP)

( * ) Notice: Subject to any disclaimer, the term of this patent is extended or adjusted under 35 U.S.C. 154(b) by 289 days.

(21) Appl. No.: 12/991,014

(22) PCT Filed: May 13, 2009

(86) PCT No.: PCT/JP2009/058940
§ 371 (c)(1),
(2), (4) Date: Nov. 4, 2010

(87) PCT Pub. No.: WO2009/139424
PCT Pub. Date: Nov. 19, 2009

(65) Prior Publication Data
US 2011/0066292 A1 Mar. 17, 2011

(30) Foreign Application Priority Data

May 14, 2008 (JP) .................................. 2008-127529
May 14, 2008 (JP) .................................. 2008-127632
May 14, 2008 (JP) .................................. 2008-127633

(51) Int. Cl.
*G05B 13/00* (2006.01)

(52) U.S. Cl.
USPC ....................................................... 700/280

(58) Field of Classification Search
USPC ....................................................... 700/280
See application file for complete search history.

(56) References Cited

U.S. PATENT DOCUMENTS 4,435,751 A * 3/1984 Hori et al. ...................... 700/280
5,792,948 A * 8/1998 Aoki et al. ................. 73/115.01
(Continued)

FOREIGN PATENT DOCUMENTS

JP 08261276 10/1996
JP 09230943 9/1997
(Continued)

*Primary Examiner* — Mohammad Ali
*Assistant Examiner* — Sivalingam Sivanesan
(74) *Attorney, Agent, or Firm* — Harness, Dickey & Pierce, PLC

(57) ABSTRACT

[Object] To predetermine a target vibration level and keep vibration generated at a position at which vibration is to be controlled equal to or smaller than a target vibration level.
[Solving Means] A frequency detection means for detecting a frequency of vibration arising from a vibration generation source, a vibration detection means for detecting vibration of a frequency that is equal to the frequency of the vibration arising from the vibration generation source that is detected by the frequency detection means at a position at which vibration is to be controlled, a vibration level conversion means for converting the detected vibration into a vibration level, a vibration means provided at a position that is different from or the same as the position at which vibration is to be controlled, for generating a vibration control force with which the position at which vibration is to be controlled is vibrated, a comparison means for comparing the vibration level with a predetermined target vibration level, and a vibration command generation means for generating, based on a comparison result obtained by the comparison means, a vibration command for reducing vibration so that the vibration level is changed into the target vibration level in a case where the vibration level is larger than the target vibration level, and outputting the generated vibration command to the vibration means are provided.

9 Claims, 17 Drawing Sheets

(56) References Cited

U.S. PATENT DOCUMENTS

| | | | | |
|---|---|---|---|---|
| 6,085,121 | A * | 7/2000 | Stern | 700/175 |
| 6,144,181 | A * | 11/2000 | Rehm et al. | 318/629 |
| 7,540,697 | B2 * | 6/2009 | Wang et al. | 409/141 |
| 8,005,574 | B2 * | 8/2011 | Inagaki | 700/280 |
| 8,014,903 | B2 * | 9/2011 | Inagaki | 700/280 |
| 8,381,579 | B2 * | 2/2013 | Sato et al. | 73/117.03 |
| 8,401,735 | B2 * | 3/2013 | Muragishi et al. | 701/37 |
| 2007/0205740 | A1 * | 9/2007 | Imadu et al. | 318/611 |
| 2008/0289923 | A1 * | 11/2008 | Suzuki et al. | 188/379 |
| 2012/0222929 | A1 * | 9/2012 | Muragishi et al. | 188/379 |

FOREIGN PATENT DOCUMENTS

| | | | |
|---|---|---|---|
| JP | 09280307 | | 10/1997 |
| JP | 10049204 | | 2/1998 |
| JP | 2002-018359 | * | 1/2002 |
| JP | 2002018359 | | 1/2002 |
| JP | 2003195951 A | | 7/2003 |
| JP | 2003-222186 | * | 8/2003 |
| JP | 2003222186 | | 8/2003 |
| JP | 2004100739 | | 4/2004 |
| JP | 2004343964 | | 12/2004 |
| WO | 2005124475 A1 | | 12/2005 |

* cited by examiner

VIBRATION CONTROL DEVICE AND VEHICLE

FIELD

The present invention relates to a vibration control device that suppresses generated vibration and a vehicle equipped with the vibration control device.

BACKGROUND

From the past, there is known a vibration control device that generates a vibration control force by a vibration means and positively adding vibration to vibration of a vehicle that is caused by a fluctuation of an output torque of an engine of the vehicle, to thereby cancel the vibration of the vehicle. More specifically, as such a vibration control device, there is proposed a device including a linear actuator serving as a vibration means that is provided to an engine serving as a vibration generation source, means for detecting the rpm of the engine serving as the vibration generation source, a vibration detection means for detecting vibration at a position at which vibration is to be controlled, and an adaptive control algorithm with which a vibration command is output to the linear actuator provided between the engine and a vehicle body based on the detected rpm of the engine and the detected vibration at the position at which vibration is to be controlled (for example, see Patent Document 1). In this vibration control device, it is possible to output, by the adaptive control algorithm, a vibration command having an optimum amplitude and phase corresponding to the rpm of the engine and the vibration currently being detected at the position at which vibration is to be controlled, with the result that the vibration that is generated from the engine serving as the vibration generation source and is transmitted to the position at which vibration is to be controlled, such as a seat portion, can be reduced by a vibration control force generated from the vibration means.

In addition, there is known a vibration reducing device that makes, when a vehicle state changes between two vehicle states that are different in engine load, vibration levels substantially equal to each other around that change and prevents an occupant from feeling a sense of discomfort (see, for example, Patent Document 2). This device stores a vibration level obtained when the vibration within the vehicle is reduced by an operation of a vibration device at a time when large engine load is large, and controls the vibration device to make vibration close to the stored vibration level when the engine load is small. By performing the control as described above, it is possible to keep the vibration level equal even when the load of the engine is changed.

On the other hand, as a vibration means for reciprocating, there is known a linear actuator in which a mover is supported by an elastic support portion (plate spring) so as to be capable of reciprocating with respect to a stator (see, for example, Patent Document 3). In this linear actuator, since the mover is not worn, the accuracy of shaft support is not reduced even after a long period of use. Further, since slide resistance does not act on the mover, a loss of power consumption due to the slide resistance is small. Furthermore, since a bulky coil and the elastic support portion are arranged close to each other, it is possible to miniaturize the linear actuator.

The linear actuator disclosed in Patent Document 3 can cancel the vibration generated from a target device whose vibration is to be controlled, by a reaction force at a time of drive. In other words, the actuator can reduce the vibration of the vibration control target device by applying a current command so that the reaction force generated from the actuator has an opposite phase with respect to a vibration acceleration of the vibration control target device. It should be noted that the mover is generally given an auxiliary mass (weight) in order to increase the reaction force of the actuator. The vibration control device using such a linear actuator is attached to a vehicle body of an automobile, with the result that a force transmitted from an engine of the automobile to the vehicle body can be cancelled and thus the vibration of the vehicle can be reduced.

Patent Document 1: Japanese Patent Application Laid-open No. Hei 10-049204
Patent Document 2: Japanese Patent Application Laid-open No. Hei 08-261276
Patent Document 3: Japanese Patent Application Laid-open No. 2004-343964

SUMMARY

Problem to be Solved by the Invention

Incidentally, an automobile in recent years controls a drive state of the engine in accordance with a traveling state. For example, in a four cylinder engine, the control of improving a fuel efficiency by stopping a predetermined number of cylinders in a case of the traveling at a constant speed, the control of suppressing fuel consumption of the engine by generating a drive force by a motor at a time of hard acceleration in a hybrid vehicle equipped with the engine and the motor, and the like are performed.

In a case where the device for suppressing vibration, which is described in Patent Documents 1 and 2, is used in an automobile as described above, the vibration is always suppressed in a direction in which vibration is reduced, even when a state of vibration generated within the vehicle is changed. An occupant grasps the state of the traveling vehicle that the occupant is driving from a change of vibration or sound. Therefore, when the control of suppressing vibration is performed so as to constantly keep vibration in a low level irrespective of the traveling state of the vehicle, there arises a problem that it is difficult to grasp the traveling state of the vehicle and the occupant feels a sense of discomfort. Although the vibration of the vehicle is desirably suppressed to a low level as a whole, it is desirable to reproduce a vibration level corresponding to a traveling state of the vehicle such as acceleration feeling and traveling at a constant speed. Further, the recent automobile performs a cylinder stop or an operation of switching to a motor in accordance with the traveling state in order to improve the fuel efficiency. However, when the vibration state is changed due to the number of cylinders of the engine or the switching from the engine to the motor, a sense of discomfort is caused. In a case where the traveling state such as acceleration and deceleration is not changed and only the control of the engine is switched as described above, it is necessary to control a vibration level so that the switching as described above is unnoticeable.

The present invention has been made in view of the circumstances as described above, and it is an object of the present invention to provide a vibration control device and a vehicle equipped with the vibration control device that are capable of keeping vibration generated at a position of a vibration control target equal to or smaller than a target vibration level.

Means for Solving the Problem

According to the present invention, there is provided a vibration control device including: a frequency detection means for detecting a frequency of vibration arising from a vibration generation source; a vibration detection means for detecting vibration of a frequency that is equal to the frequency of the vibration arising from the vibration generation source that is detected by the frequency detection means at a position at which vibration is to be controlled; a vibration level conversion means for converting the detected vibration into a vibration level; a vibration means provided at a position that is different from or the same as the position at which vibration is to be controlled, for generating a vibration control force with which the position at which vibration is to be controlled is vibrated; a comparison means for comparing the vibration level with a predetermined target vibration level; and a vibration command generation means for generating, based on a comparison result obtained by the comparison means, a vibration command for reducing vibration so that the vibration level is changed into the target vibration level in a case where the vibration level is larger than the target vibration level, and outputting the generated vibration command to the vibration means.

With this structure, when the vibration detection means detects vibration of a frequency equal to the frequency of the vibration arising from the vibration generation source, which is detected by the frequency detection means, the vibration level conversion means converts the detected vibration into a vibration level. Then, based on the result of comparing the vibration level with the predetermined target vibration level by the comparison means, the vibration command generation means generates a vibration command for reducing vibration so that the vibration level is changed into the target vibration level and outputs the vibration command to the vibration means. Then, the vibration means generates a vibration control force with which the position at which vibration is to be controlled is vibrated, based on the vibration command output by the vibration command generation means. Therefore, the vibration at the position at which vibration is to be controlled is kept equal to or smaller than the target vibration level. In addition, since the vibration control force is generated only when the vibration level exceeds the target vibration level, the energy for controlling vibration can be reduced and the structure of the vibration control device can also be made simple.

The vibration command generation means may generate, based on the comparison result obtained by the comparison means, the vibration command for reducing vibration so that the vibration level is changed into the target vibration level in the case where the vibration level is larger than the target vibration level, or a vibration command for increasing vibration so that the vibration level is changed into the target vibration level in a case where the vibration level is smaller than the target vibration level, and output the generated vibration command to the vibration means.

With this structure, based on the result of comparing the vibration level with the predetermined target vibration level by the comparison means, the vibration command generation means generates the vibration command for reducing or increasing vibration so that the vibration level is changed into the target vibration level, and outputs the vibration command to the vibration means. Then, the vibration means generates a vibration control force with which the position at which vibration is to be controlled is vibrated, based on the vibration command output by the vibration command generation means. Therefore, the vibration at the position at which vibration is to be controlled is kept in the target vibration level.

The vibration command generation means may generate the vibration command by multiplying a signal output by the vibration detection means by a gain generated based on the comparison result obtained by the comparison means.

With this structure, since the vibration command of a vibration force to be generated is generated by multiplying the detected vibration by a gain generated by the vibration command generation means based on the comparison result, the vibration command can be generated without performing a complicated operation or the like, and a circuit structure of the vibration control device can be made simple.

The vibration level conversion means may convert the vibration detected by the vibration detection means into the vibration level through an absolute value circuit and a notch filter that attenuates a frequency component twice as large as the frequency of vibration to be controlled.

With this structure, it is possible to improve the responsiveness of conversion from a signal of the detected vibration to a vibration level and also improve the accuracy of conversion.

The vibration means may be attached to a vehicle body frame of a vehicle.

With this structure, since the level of vibration generated in the vehicle body frame can be set to a predetermined target vibration level, it is possible to prevent an occupant from feeling a sense of discomfort. Therefore, even when a vibration state is changed due to the number of cylinders of the engine or the switching between the engine and the motor and thus the vibration is increased, it is possible to prevent an occupant from feeling a sense of discomfort. In addition, since the vibration level at the position at which vibration is to be controlled is kept equal to or smaller than the predetermined target vibration level, it is possible to reproduce a vibration level corresponding to a traveling state of the vehicle such as acceleration feeling and traveling at a constant speed. Therefore, it is possible to avoid a state in which the vibration level temporarily exceeds the target vibration level and prevent vibration for which an occupant feels uncomfortable from being generated.

According to the present invention, there is provided a vehicle including the vibration control device described above.

With this structure, since the level of vibration generated can be set to a predetermined target vibration level by the vibration control device, it is possible to prevent an occupant from feeling a sense of discomfort even when a vibration state is changed due to the number of cylinders of the engine or the switching between the engine and the motor. In addition, since a vibration level corresponding to a traveling state of the vehicle such as acceleration feeling and traveling at a constant speed can be reproduced, it is possible to cause an occupant to feel the traveling state of the vehicle by means of vibration without causing the occupant to feel a sense of discomfort.

Further, according to another aspect of the present invention, there is provided a vibration control device including: a frequency detection means for detecting a frequency of vibration arising from a vibration generation source; a vibration detection means for detecting vibration of a frequency that is equal to the frequency of the vibration arising from the vibration generation source that is detected by the frequency detection means at a position at which vibration is to be controlled; a vibration level conversion means for converting the detected vibration into a vibration level; a vibration means provided at a position that is different from or the same as the position at which vibration is to be controlled, for generating a vibration control force with which the position at which vibration is to be controlled is vibrated; a comparison means for comparing the vibration level with a predetermined target vibration level; and a vibration command generation means for generating, as a result of the comparison made by the comparison means, in a case where the vibration level is different from the target vibration level, a vibration command for reducing or increasing vibration so that the vibration level is changed into the target vibration level by changing a gain based on a result of the comparison between the target vibration level and the vibration level, and outputting the generated vibration command to the vibration means.

With this structure, when the vibration detection means detects vibration of a frequency equal to the frequency of the vibration arising from the vibration generation source, which is detected by the frequency detection means, the vibration level conversion means converts the detected vibration into a vibration level. Then, based on the result of comparing the vibration level with the predetermined target vibration level by the comparison means, the vibration command generation means generates a vibration command by changing a current limit value so as to reduce or increase vibration whose vibration level is changed into the target vibration level, and outputs the vibration command to the vibration means. Then, the vibration means generates a vibration control force with which the position at which vibration is to be controlled is vibrated, based on the vibration command output by the vibration command generation means. Therefore, the vibration at the position at which vibration is to be controlled is kept in the target vibration level.

The vibration means may be attached to a vehicle body frame of a vehicle.

With this structure, since the level of vibration generated in the vehicle body frame can be set to a predetermined target vibration level, it is possible to prevent an occupant from feeling a sense of discomfort. Therefore, even when a vibration state is changed due to the number of cylinders of the engine or the switching between the engine and the motor, it is possible to prevent an occupant from feeling a sense of discomfort. In addition, since the vibration level at the position at which vibration is to be controlled is kept in the predetermined target vibration level, it is possible to reproduce a vibration level corresponding to a traveling state of the vehicle such as acceleration feeling and traveling at a constant speed even when the traveling state of the vehicle is changed.

According to the present invention, there is provided a vehicle including the vibration control device described above.

With this structure, since the level of vibration generated can be set to a predetermined target vibration level by the vibration control device, it is possible to prevent an occupant from feeling a sense of discomfort even when a vibration state is changed due to the number of cylinders of the engine or the switching between the engine and the motor. In addition, since a vibration level corresponding to a traveling state of the vehicle such as acceleration feeling and traveling at a constant speed can be reproduced, it is possible to cause an occupant to feel the traveling state of the vehicle by means of vibration without causing the occupant to feel a sense of discomfort.

Effect of the Invention

According to the present invention, the effect of enabling a vibration level at a position of a vibration control target to be kept equal to or smaller than a predetermined target vibration level can be obtained.

DETAILED DESCRIPTION

Best Modes for Carrying Out the Invention

Hereinafter, a vibration control device according to embodiments of the present invention will be described with reference to the drawings.

(First Embodiment)

Figure 1:
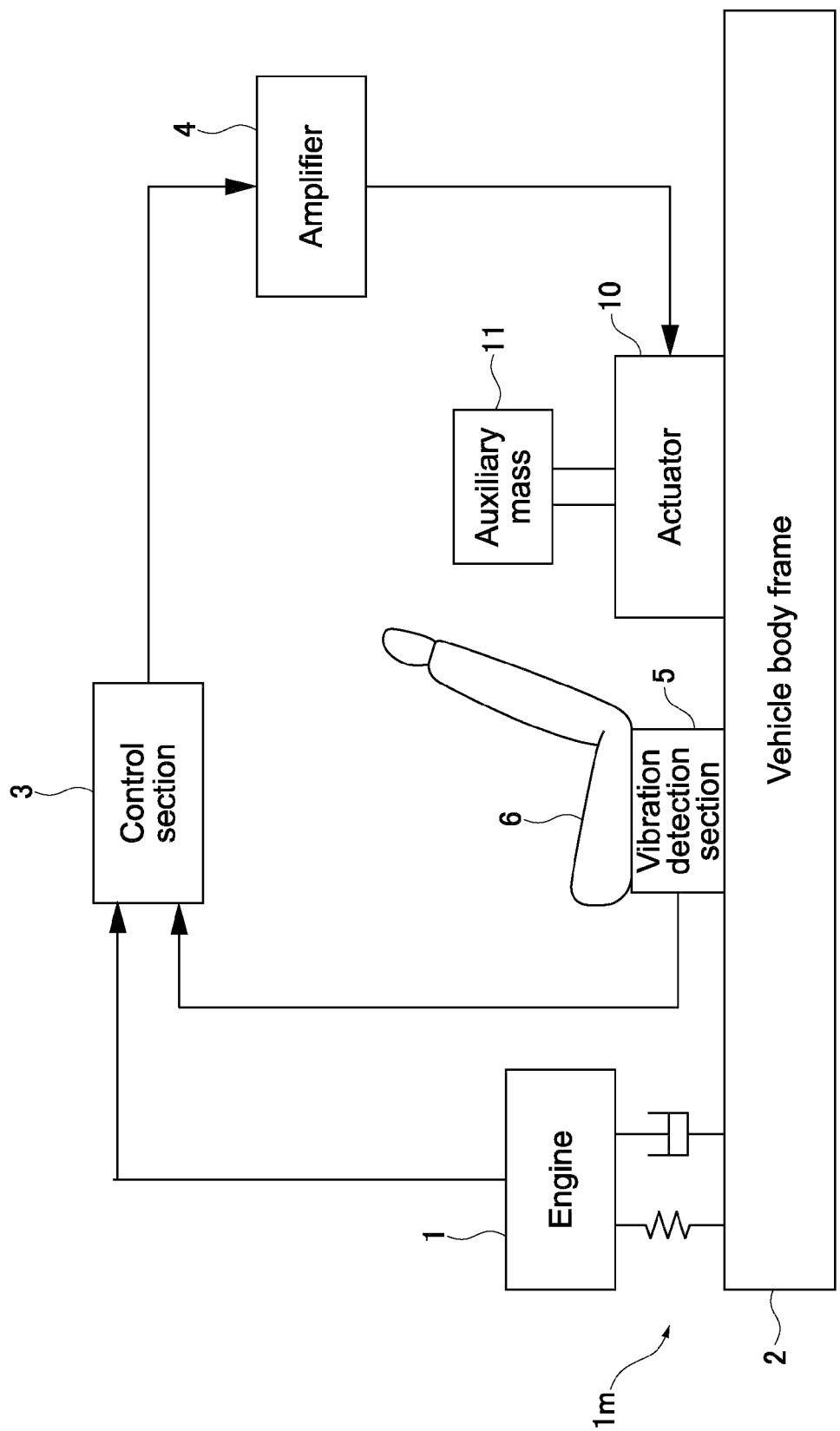
FIG. 1 is a block diagram showing a structure of a first embodiment of the present invention.

FIG. 1 is a block diagram showing a structure of this embodiment. In the figure, an engine 1 is mounted to a vehicle so as to generate a drive force for causing a vehicle such as an automobile to travel and is a generation source of vibration generated in the vehicle. A linear actuator 10 (hereinafter, referred to as actuator) includes an auxiliary mass 11 having a predetermined mass, and generates a vibration control force for suppressing the vibration generated in the vehicle by means of a reaction force obtained by vibrating the auxiliary mass 11. A vehicle body frame 2 of the vehicle is equipped with the engine 1 through an engine mount 1m, and the actuator 10 is mounted to the vehicle body frame 2 at a predetermined position. Here, the actuator 10 suppresses and controls vibration in a direction of a thrust axis thereof, that is, vibration in a vertical direction (direction of gravity) that is generated in the vehicle body frame 2 in this embodiment.

A control section 3 causes the actuator 10 to generate a vibration control force and controls vibration generated in the vehicle to be suppressed. An amplifier 4 supplies a current for driving the actuator 10 to the actuator 10 based on a command value that is output from the control section 3. A vibration detection section 5 is attached in the vicinity of a seat 6 for an occupant in the vehicle, and has an accelerometer therein. The control section 3 calculates a force command value for driving the actuator 10, based on an excitation frequency signal calculated from a cycle of an ignition timing signal output from the engine 1, a crank angle signal, and engine rpm information obtained from an engine computer (ECU) etc., and a vibration signal output from the vibration detection section 5, and outputs the force command value to the amplifier 4. The amplifier 4 calculates a current value to be supplied to the actuator 10 based on the force command value and supplies the current value to the actuator 10, with the result that the auxiliary mass reciprocates (in example shown in FIG. 1, movement in vertical direction).

Figure 2:
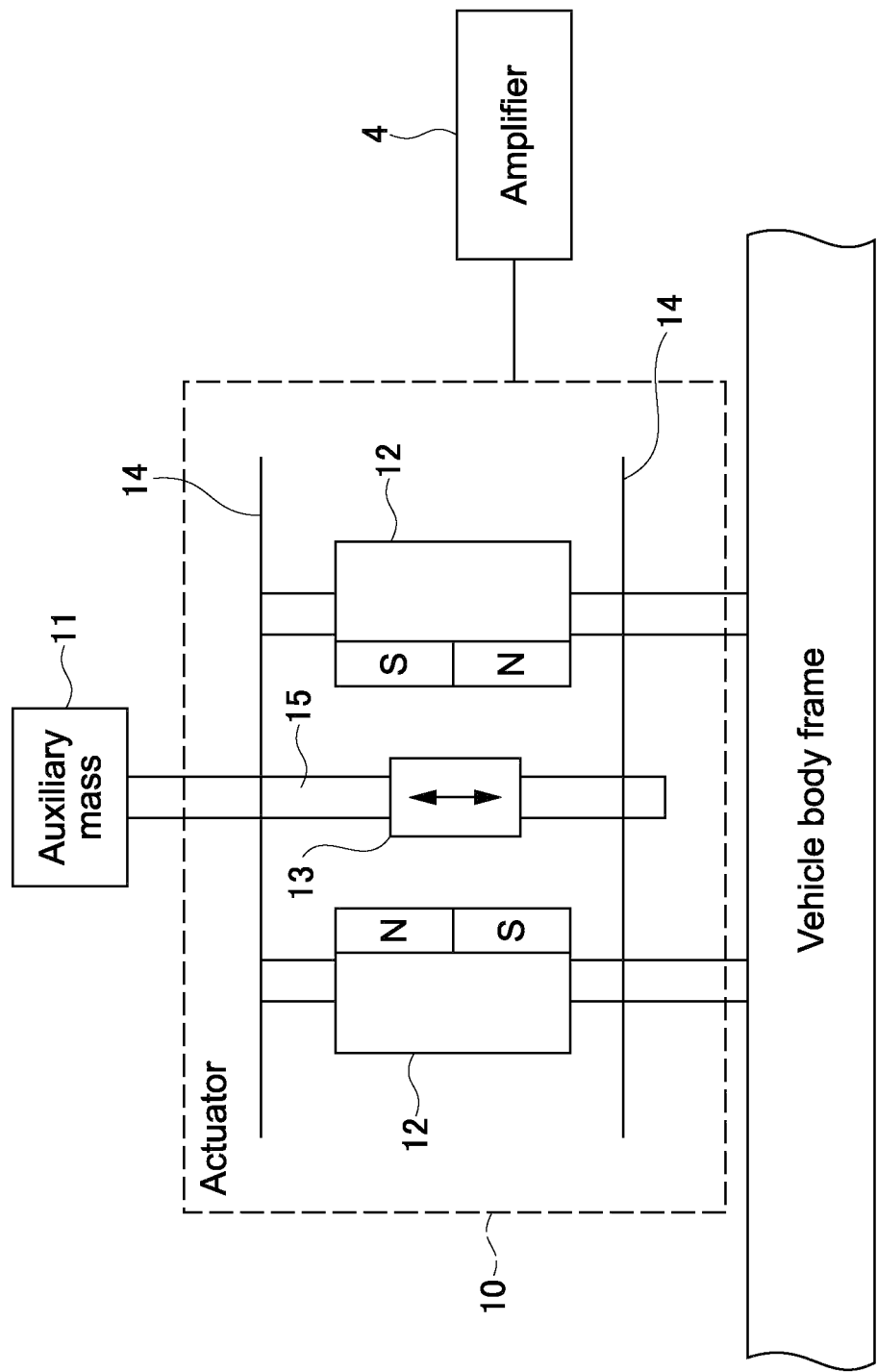
FIG. 2 is a schematic diagram showing a structure of an actuator 10 shown in FIG. 1.

Here, with reference to FIG. 2, a detailed structure of the actuator 10 shown in FIG. 1 will be described. FIG. 2 is a diagram showing a detailed structure of the actuator 10 shown in FIG. 1. In this figure, a stator 12 includes a permanent magnet and is fixed to the vehicle body frame 2. A mover 13 reciprocates in a direction that is the same as a direction of vibration to be suppressed (on plane of FIG. 2, vertical movement). Here, the mover 13 is fixed to the vehicle body frame 2 so that the direction of vibration to be suppressed in the vehicle body frame 2 coincides with the reciprocating direction (thrust direction) of the mover 13. A plate spring 14 supports the mover 13 and the auxiliary mass 11 so as to be movable in the thrust direction and is fixed to the stator 12. A shaft 15 joints the mover 13 and the auxiliary mass 11 and is supported by the plate spring 14. The actuator 10 and the auxiliary mass 11 constitute a dynamic vibration absorber.

Next, an operation of the actuator 10 shown in FIG. 2 will be described. In a case where an alternating current (sine-wave current, square-wave current) is caused to flow through a coil constituting the actuator 10 (now shown), in a state where a current of a predetermined direction flows through the coil, a magnetic flux is guided from the south pole to the north pole of the permanent magnet, with the result that a magnetic flux loop is formed. As a result, the mover 13 moves in a direction opposite to the gravity (upward direction). On the other hand, in a case where a current is caused to flow in the direction opposite to the predetermined direction with respect to the coil, the mover 13 moves in the direction of the gravity (downward direction). The mover 13 repeats the operation described above due to the direction of the current flowing through the coil, which is alternately changed by the alternating current, and reciprocates in the shaft direction of the shaft 15 with respect to the stator 12. Accordingly, the auxiliary mass 11 jointed to the shaft 15 vibrates in the vertical direction. The dynamic vibration absorber constituted of the actuator 10 and the auxiliary mass 11 can cancel the vibration generated in the vehicle body frame 2 and reduce vibration by controlling an acceleration of the auxiliary mass 11 and adjusting a vibration control force based on a current control signal output from the amplifier 4.

Figure 3:
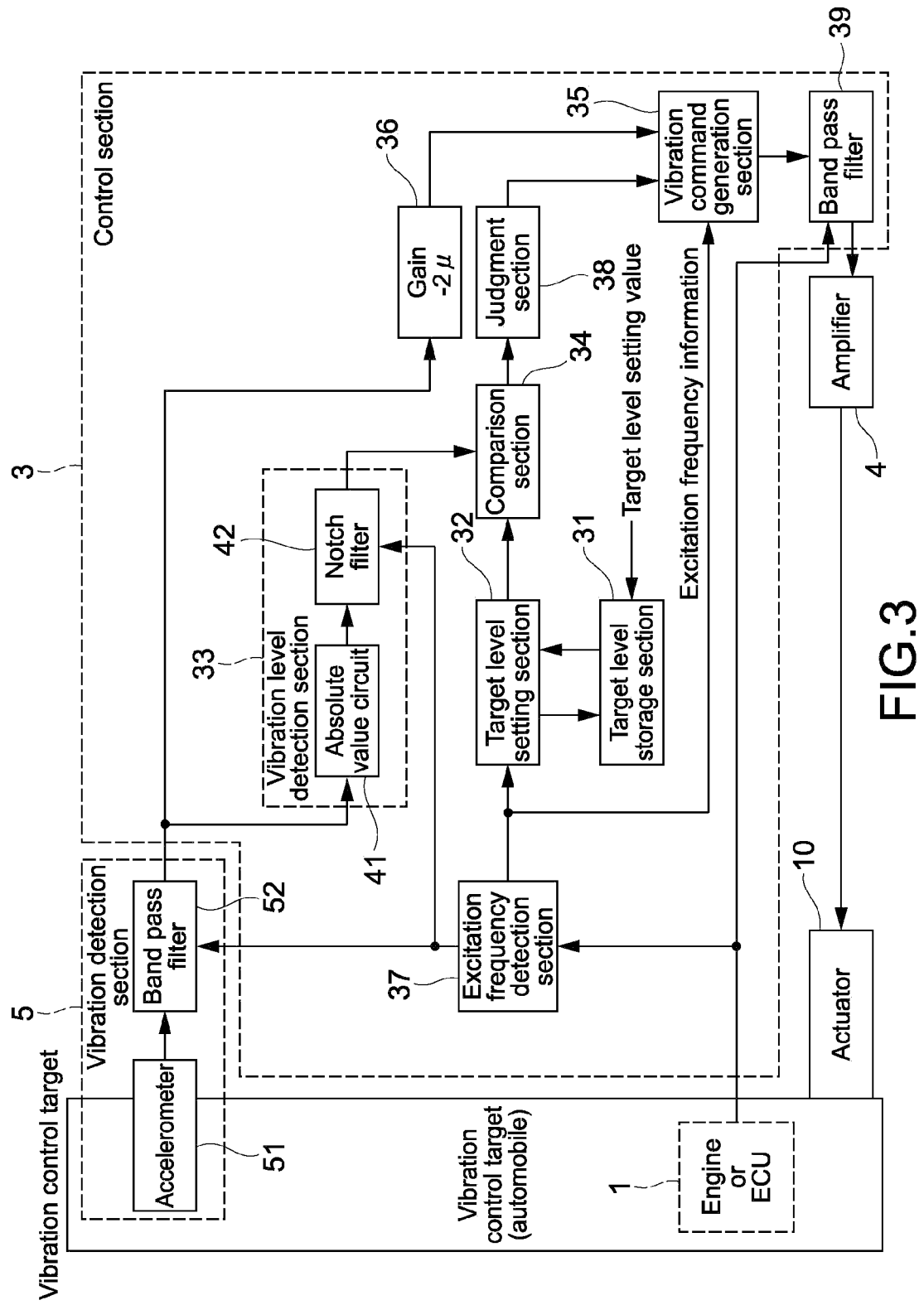
FIG. 3 is a block diagram showing a structure of a control section 3 shown in FIG. 1.

Next, with reference to FIG. 3, a structure of the control section 3 shown in FIG. 1 will be described. FIG. 3 is a block diagram showing the structure of the control section 3 shown in FIG. 1. In FIG. 3, an accelerometer 51 detects vibration at a position at which vibration is to be controlled. A band pass filter 52 causes only a frequency of a vibration control target to pass therethrough. The band pass filter 52 causes only a frequency component of the vibration control target to pass therethrough by inputting a vibration control target frequency that is output from an excitation frequency detection section 37 based on a signal related to an engine rpm, such as a frequency of an ignition pulse signal output from the engine 1. The excitation frequency detection section 37 determines a frequency of vibration to be controlled (vibration control target frequency) based on the engine rpm information and the ignition pulse signal that are obtained from the engine 1, an ECU (Engine Control Unit) that drives and controls the engine 1, and the like, and outputs a frequency signal thereof. For example, in a case of a four-stroke cycle engine, when vibration to be controlled is caused by ignition of each cylinder, a frequency corresponding to rpm×number of cylinders/2 is obtained.

A target level storage section 31 stores a value of an excitation frequency and a value of a target vibration level, which is a vibration level to be reached, in association with each other in advance. A target level setting section 32 inputs information of an excitation frequency that is output by the excitation frequency detection section 37, reads a target vibration level associated with the input excitation frequency from the target level storage section 31, and outputs a target vibration level signal corresponding to the read target vibration level. Although the target level storage section 31 shown in FIG. 3 is a table in which the values of the excitation frequency and the target vibration level are associated with each other, the values are not limited to the excitation frequency and may be other values indicating a traveling state of the vehicle. For example, the table may be a table in which values of a traveling speed and values of the target vibration level are associated with each other. In this case, the target level setting section 32 may only need to input speed information of the vehicle instead of the excitation frequency.

A vibration level detection section 33 detects a vibration level from the signal output from the vibration detection section 5, and outputs a vibration level signal corresponding to the detected vibration level. The vibration level detection section 33 is constituted of an absolute value circuit 41 and a notch filter 42. The absolute value circuit 41 calculates an absolute value of an input acceleration signal. The notch filter 42 inputs an output of the absolute value circuit 41 and a vibration control target frequency output from the excitation frequency detection section 37 and attenuates a frequency component twice as large as the vibration control target frequency. The notch filter 42 outputs a vibration level signal corresponding to the acceleration signal.

A comparison section 34 compares the size of the target vibration level signal output from the target level setting section 32 with that of the vibration level signal output from the vibration level detection section 33, and calculates a difference between the target vibration level signal and the vibration level signal. The comparison section 34 outputs a comparison result to a judgment section 38. The judgment section 38 judges whether a vibration control force is to be generated based on the comparison result calculated by the comparison section 34. The judgment section 38 judges that the vibration control force should be generated in a case where the vibration level detected by the vibration level detection section 33 is larger than the target vibration level. A vibration command generation section 35 inputs an output obtained by multiplying the output of the band pass filter 52 by a gain $-2\mu$ by a gain multiplication section 36, the excitation frequency, and an output of the judgment section 38, and generates a vibration command with which a vibration control force for changing the current vibration level into the target vibration level is generated. The vibration command generation section 35 outputs a vibration command with which a vibration control force for reducing vibration so that the vibration level is changed into the target vibration level is generated only when the vibration level is larger than the target vibration level.

Figure 6:
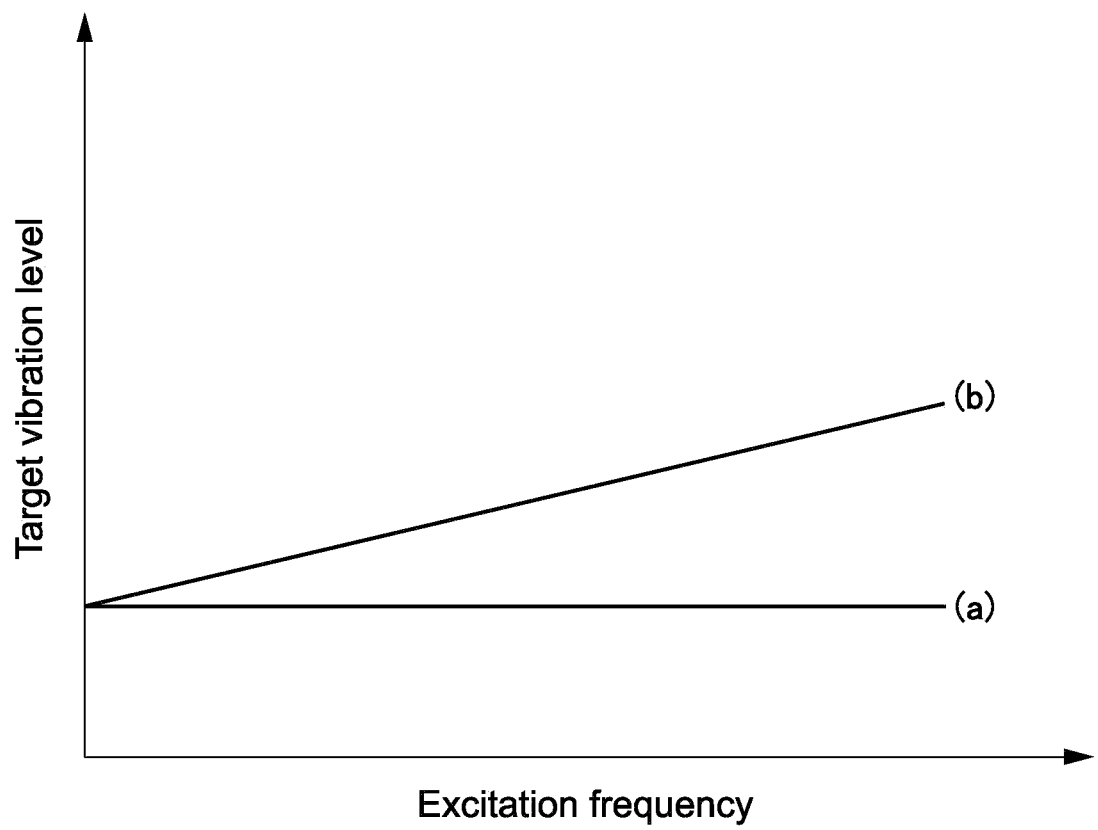
FIG. 6 is an explanatory diagram showing a relationship between an engine rpm and a target vibration level stored in a target level storage section 31 shown in FIG. 3.

Here, with reference to FIG. 6, information stored in the target level storage section 31 shown in FIG. 3 will be described. FIG. 6 is a diagram showing a relationship between an excitation frequency number and a target vibration level stored in the target level storage section 31. In the target level storage section 31, a level value of vibration (target vibration level) to be reached for each excitation frequency is stored. A target vibration level shown in FIG. 6(*a*) shows an example of a target vibration level in which a vibration level to be reached irrespective of an excitation frequency is set as a constant value. In addition, the target vibration level shown in FIG. 6(*b*) shows an example of a target vibration level in a case where a vibration level to be reached is gradually increased in accordance with an increase of an excitation frequency. Stored in the target level storage section 31 is a target vibration level value that corresponds to an excitation frequency tabulated based on the relationship between the target vibration level and the excitation frequency shown in FIG. 6. In the example shown in FIG. 6, two types of relationships (a) and (b) between the target vibration level and the excitation frequency are shown, but at least one relationship therebetween may only need to be stored. In addition, although the example in which the stored table shows the relationship between the excitation frequency and the vibration level is shown, the table may be a multidimensional table of a relationship among an acceleration, a fuel injection amount, and a vibration level, or a combination thereof.

It should be noted that the table showing the relationship between the excitation frequency and the target vibration level stored in the target level storage section 31 may be rewritable by inputting a setting value from the outside (for example, control device mounted to automobile). In addition, it may also be possible to store tables showing relationships between a plurality of target vibration levels and excitation frequencies in advance and select an appropriate table in accordance with a target vibration level to be reached that is input from the outside.

Next, an operation of the control section 3 shown in FIG. 3 will be described. First, the absolute value circuit 41 inputs the output signal of the band pass filter 52 and outputs an absolute value signal. The notch filter 42 inputs this absolute value signal and the excitation frequency and attenuates only a predetermined frequency component to output the resultant to the comparison section 34. Accordingly, a vibration level signal at the present time is output from the notch filter 42 and input to the comparison section 34.

On the other hand, the target level setting section 32 inputs the information of the excitation frequency from the excitation frequency detection section 37 and identifies an excitation frequency at the present time. Then, the target level setting section 32 reads a target vibration level value that is associated with the identified excitation frequency from the target level storage section 31. Subsequently, the target level setting section 32 outputs a target vibration level signal corresponding to the read target vibration level value to the comparison section 34. The comparison section 34 outputs, to the judgment section 38, a ratio or a difference signal that indicates a difference between the vibration level signal and target vibration level to be input. The gain multiplication section 36 multiplies the output of the band pass filter 52 (detected vibration signal) by a predetermined gain (−2μ) and outputs the resultant to the vibration command generation section 35. The judgment section 38 inputs the output of the comparison section 34, judges that a vibration control force should be generated only when the vibration level detected by the vibration level detection section 33 is larger than the target vibration level, and outputs a signal of the judgment result to the vibration command generation section 35.

The vibration command generation section 35 obtains a vibration command to be generated, based on the vibration signal multiplied by the gain, the vibration signal being output from the gain multiplication section 36, the excitation frequency, and the signal of the judgment result of the judgment section 38, and outputs the vibration command to the amplifier 4. Accordingly, the vibration command generation section 35 outputs a vibration command of a vibration control force for reducing vibration so that the vibration level is changed into the target vibration level by the actuator 10 when the vibration level signal is larger than the target vibration level signal. Further, the vibration command generation section 35 does not output a vibration command when the vibration level signal is smaller than the target vibration level signal. Accordingly, the auxiliary mass 11 vibrates and a vibration control force (force with which vibration is reduced) is generated only when the vibration level signal is larger than the target vibration level signal, with the result that with an excitation force of the engine 1 that is detected by the accelerometer 5, the vibration generated in a vibration control target is kept in the target vibration level.

Next, with reference to FIG. 4, a detailed structure and operation of the vibration command generation section 35 will be described. First, a sine-wave oscillator 351 inputs the excitation frequency from the excitation frequency detection section 37 and outputs a reference sine wave $\sin(\omega t)$ and a reference cosine wave $\cos(\omega t)$ from a reference angle $\omega t$ generated from the excitation frequency.

On the other hand, a signal of the excitation frequency component output from the band pass filter 52 ($A \sin(\omega t+\phi)$) is multiplied by the gain $-2\mu$ by the multiplier 36, and the obtained signal is multiplied by the reference sine wave $\sin(\omega t)$ and the reference cosine wave $\cos(\omega t)$ by the multiplier and integrated by integrators 352 and 353, respectively. Then, a signal with both an amplitude correction component and a phase difference component is output from each of the integrators 352 and 353. In this case, switching is made by switches 354 and 355 provided to the integrators 352 and 353, respectively, so that a vibration control force is generated only when the vibration level signal is larger than the target vibration level signal. The two switches 354 and 355 make switching as to whether the vibration control force is generated, based on the signal output from the judgment section 38. The switches 354 and 355 make switching so that a constant K0 is multiplied only when the vibration level signal is smaller than the target vibration level signal. The constant K0 is a value of 0 or more and less than 1.

Then, when a signal obtained by multiplying the output of the integrator 352 and the reference cosine wave $\cos(\omega t)$ and a signal obtained by multiplying the output of the integrator 353 and the reference sine wave $\sin(\omega t)$ are added, a signal ($-A' \sin(\omega t+\phi)$) with a inverted phase of the detection signal ($A \sin(\omega t+\phi)$) can be obtained. The signal ($-A' \sin(\omega t+\phi)$) is output to the amplifier 4, with the result that the auxiliary mass 11 vibrates only when the vibration level signal is larger than the target vibration level signal and a vibration control force (force with which vibration is reduced) is generated, and thus vibration generated by the engine 1, which is detected by the accelerometer 51, is kept equal to or smaller than the target vibration level.

Next, with reference to FIG. 5, another detailed structure and operation of the vibration command generation section 35 will be described. First, the sine-wave oscillator 351 inputs the excitation frequency from the excitation frequency detection section 37 and outputs a reference sine wave $\sin(\omega t)$ and a reference cosine wave $\cos(\omega t)$ from a reference angle $\omega t$ generated from the excitation frequency.

On the other hand, a signal $(A \sin(\omega t+\phi))$ of the frequency component of the excitation force, which is output from the band pass filter 52, is multiplied by the gain $-2\mu$ by the multiplier 36 and the signal thus obtained is individually multiplied by each of the reference sine wave $\sin(\omega t)$ and the reference cosine wave $\cos(\omega t)$. The respective multiplication results are integrated by the integrators 352 and 353. The output of the integrator 352 is multiplied by the reference cosine wave $\cos(\omega t)$, whereas the output of the integrator 353 is multiplied by the reference sine wave $\sin(\omega t)$. The respective multiplication results are added to be output as a vibration control command. This value is amplified by the amplifier 4 and then output. In this case, the integrators 352 and 353 perform the integration operation on the multiplication values of the output of the multiplier 36 and the reference sine wave/cosine wave until the output of the multiplier 36 becomes 0 (that is, until the vibration amplitude A becomes equal to 0). In this case, in a case where the vibration amplitude is smaller than a target value, the switches of feedback loops of the integrators 352 and 353 are flipped so that a gain of $0<k0<1$ is multiplied. Accordingly, the integration operation is suppressed and a vibration force is suppressed from being generated.

As described above, the vibration is controlled when the vibration is larger than a target value, and the control is suppressed when the vibration is smaller than the target value, with the result that the vibration is kept equal to or smaller than the target vibration.

Figure 4:
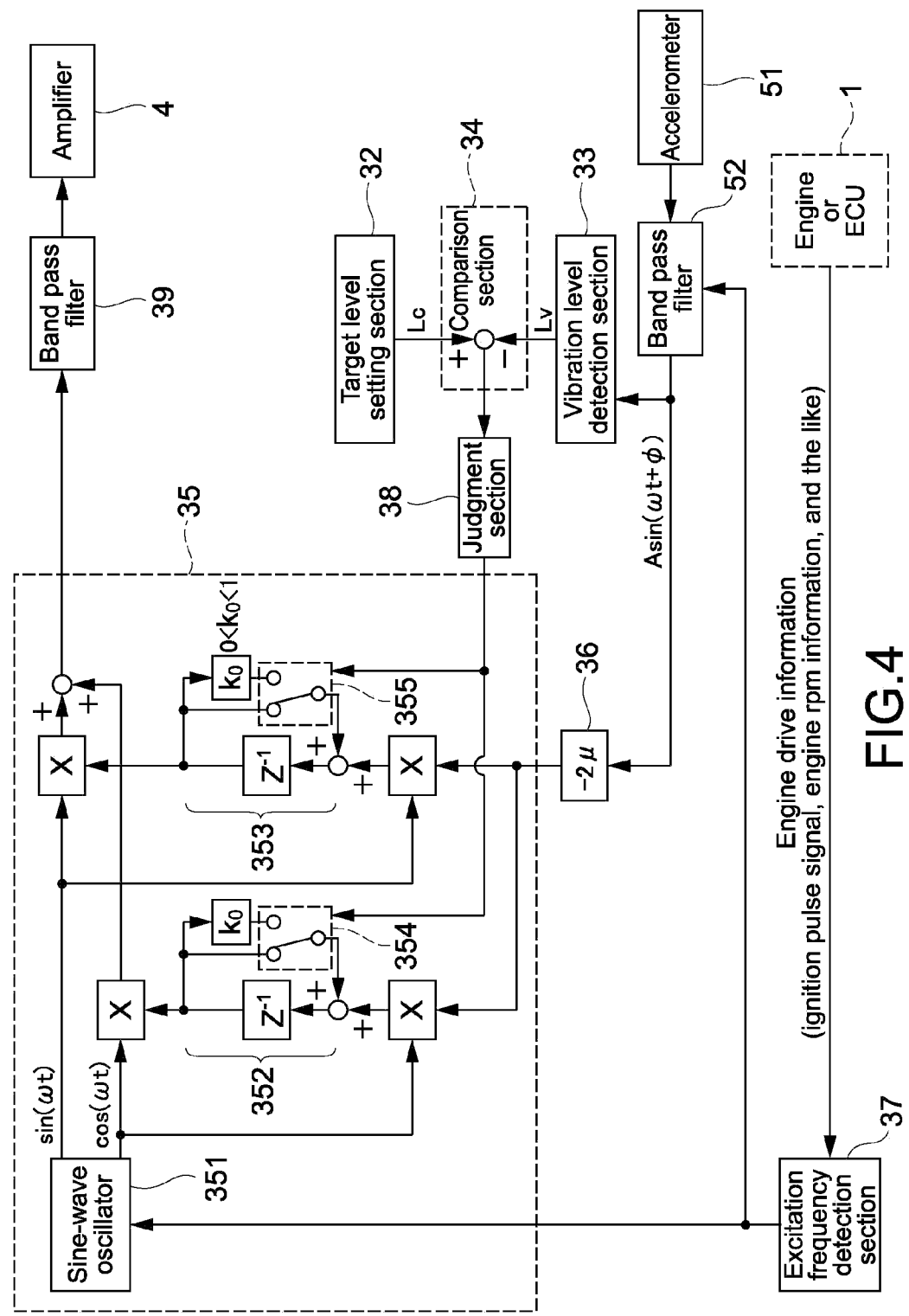
FIG. 4 is a block diagram showing a structure of a vibration command generation section 35 shown in FIG. 3.
Figure 5:
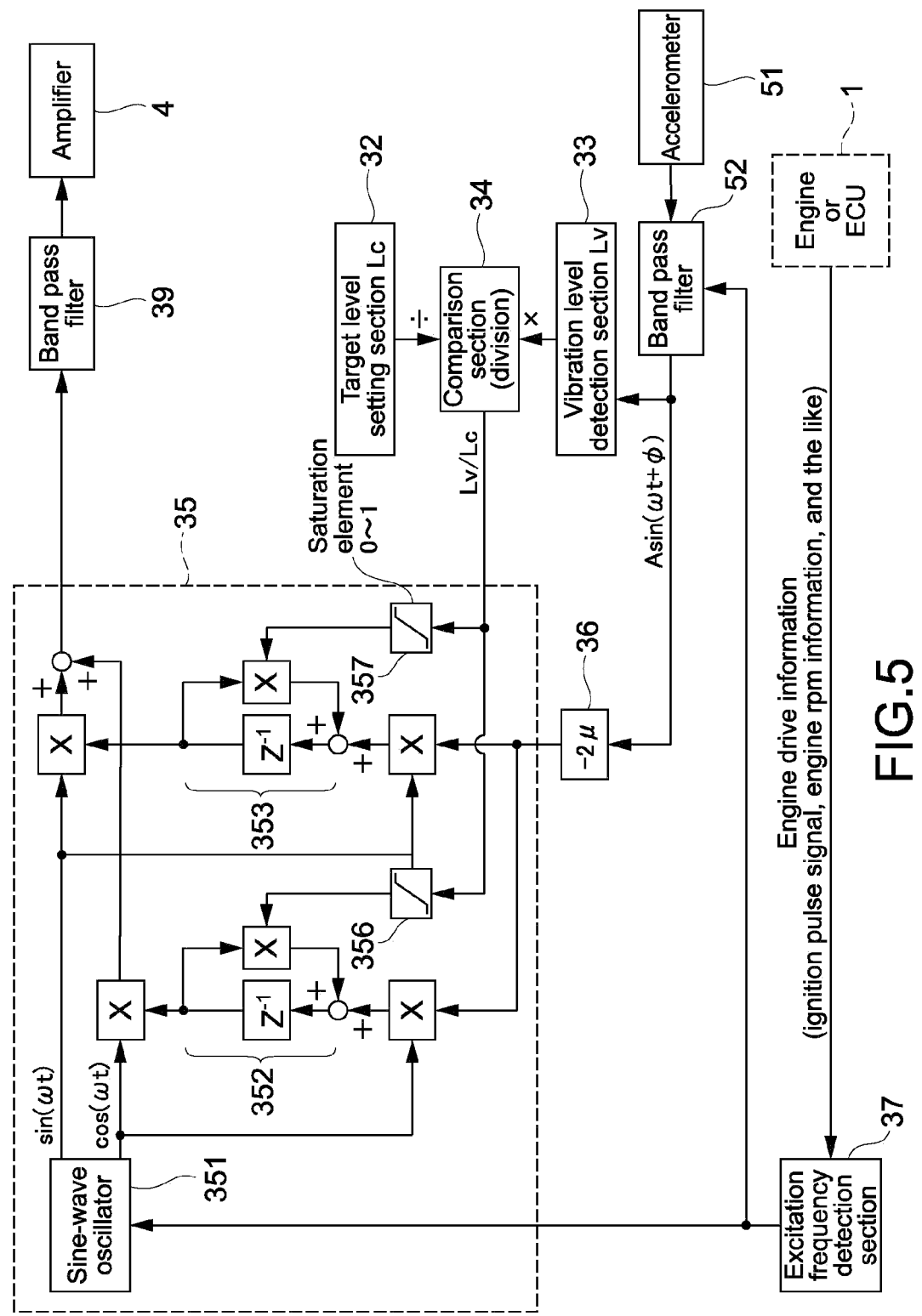
FIG. 5 is a block diagram showing a structure of the vibration command generation section 35 shown in FIG. 3.

It should be noted that in FIGS. 3 to 5, a band pass filter 39 is provided between the vibration command generation section 35 and the amplifier 4 (immediately before input to the amplifier 4). The band pass filter 39 is a filter that inputs the excitation frequency information output from the excitation frequency detection section 37 and passes only a frequency close to the excitation frequency. In a case where a frequency of vibration to be controlled (excitation frequency) fluctuates, the control section 3 follows this fluctuation and a vibration frequency of the vibration control target fluctuates accordingly. There may be a case where, due to the influence of a transient phenomenon that occurs when this frequency fluctuates, a phenomenon is caused in which a vibration force component other than the target frequency is included in a vibration control force for controlling vibration. As a result of this, vibration due to a frequency other than the frequency of vibration to be controlled is generated, and there occurs a situation in which a sufficient vibration control effect is difficult to be obtained. Particularly, in a case where the frequency of vibration to be controlled is close to a natural frequency of the control target, there may occur a phenomenon in which a resonance point is further vibrated by the close frequency component included in the vibration control force and thus the vibration is additionally increased.

To solve such a problem, the band pass filter 39 that selectively passes only the frequency component of vibration to be controlled is provided immediately before input to the amplifier 4, with the result that a vibration force component of a frequency other than the vibration control target, which is generated due to a transient phenomenon along with the fluctuation of the vibration control target frequency, can be removed efficiently and the vibration control effect can be increased. Particularly, also in a case where the vibration control target frequency is close to a natural frequency of the control target, a resonance point is not excited and the vibration control effect is more improved.

Figure 7:
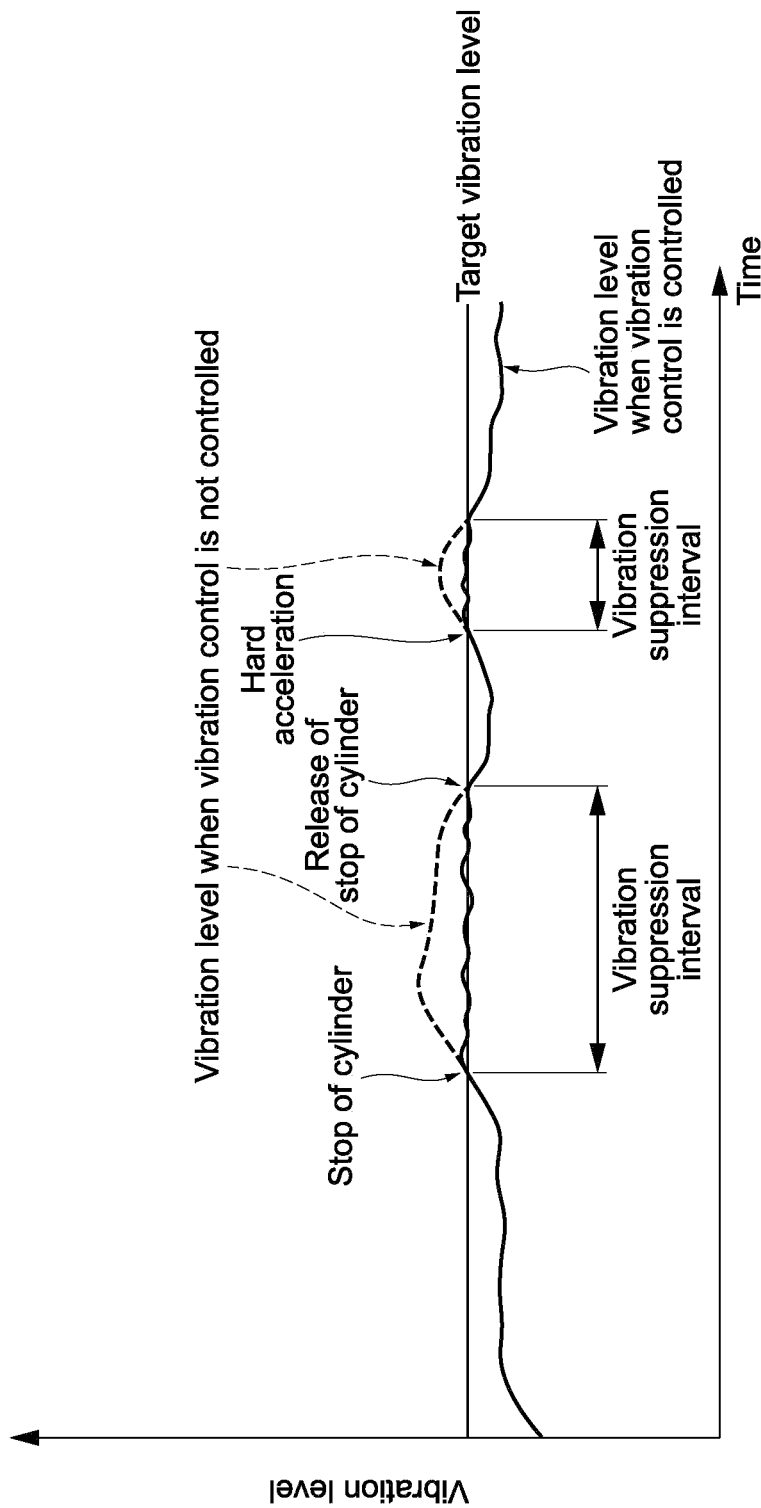
FIG. 7 is an explanatory diagram showing a relationship between a target vibration level and a vibration level.

As described above, as a result of comparison between the detected vibration level and the set target vibration level, a vibration control force for suppressing vibration so that the vibration level is changed into the target vibration level is generated by the actuator 10 in a case where the vibration level is larger than the target vibration level. Therefore, the vibration level at a position of a vibration control target can be kept equal to or smaller than a predetermined target vibration level. As shown in FIG. 7, when control of stopping a cylinder is performed in a case where the vehicle satisfies predetermined conditions during traveling at a constant speed or when the speed is rapidly accelerated from the constant speed state, there occur a situation in which the vibration level temporarily exceeds the target vibration level (portions indicated by dashed lines in FIG. 7). However, with the vibration control device described above according to the present invention, the vibration level generated in the vehicle body frame 2 is changed into a preset target vibration level or smaller, with the result that the situation in which the vibration level temporarily exceeds the target vibration level can be avoided, and vibration for which an occupant feels uncomfortable can be prevented from being generated.

In addition, since the table that defines the relationship between the excitation frequency and the target vibration level stored in the target level storage section 31 is rewritable, it is possible to realize any vibration level in accordance with the shape of the vehicle body frame 2 and characteristics of the engine 1. Further, even when a vibration state generated in the vehicle is changed, the vibration is not always suppressed in a direction in which the vibration is reduced, but controlled so as to be kept in a predetermined target vibration level in accordance with a traveling state. Accordingly, the occupant can feel the traveling state of the vehicle that the occupant is driving and a change of vibration or sound accompanying the vibration, and can perform a drive operation without feeling a sense of discomfort. In addition, also in a case where operations of stopping a cylinder or switching to a motor are performed in order to improve fuel efficiency and an excitation force is changed, it is possible to arbitrarily set a target vibration level in accordance with the traveling state of the vehicle, with the result that the occupant can perform drive without feeling a sense of discomfort such as a change of vibration accompanying the switching. Further, the vibration is represented by a value of the level, with the result that it is possible to realize the vibration level detection with a simple circuit structure while reducing consumption energy for vibration control.

(Second Embodiment)

Next, a second embodiment of the present invention will be described.

The entire structure of this embodiment is the same as that of FIG. 1 and the structure of the actuator 10 therein is the same as that of FIG. 2, so description thereof will be omitted. This embodiment is different from the first embodiment described above in the structure of the control section 3 in FIG. 1.

Figure 8:
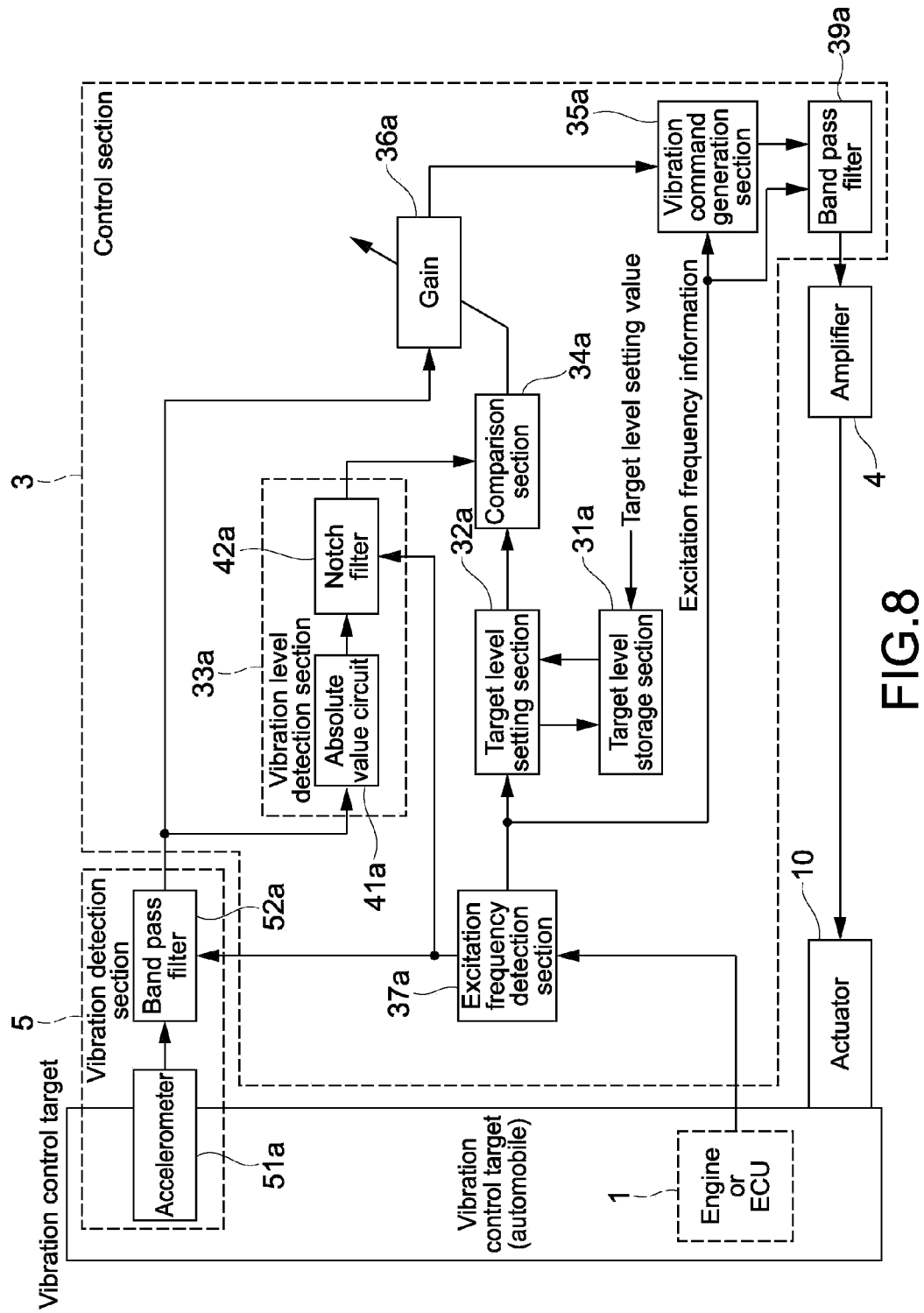
FIG. 8 is a block diagram showing a structure of a control section 3 of a second embodiment of the present invention.

FIG. 8 is a block diagram showing a structure of a control section 3 of this embodiment. In FIG. 8, an accelerometer 51a detects vibration at a position at which vibration is to be controlled. A band pass filter 52a causes only a frequency of a vibration control target to pass therethrough. The band pass filter 52a causes only a frequency component of the vibration control target to pass therethrough by inputting a vibration control target frequency that is output from an excitation frequency detection section 37a that detects a signal related to an engine rpm, such as an ignition pulse signal output from the engine 1. The excitation frequency detection section 37a determines a frequency of vibration to be controlled (vibration control target frequency) based on the engine rpm information and the ignition pulse signal that are obtained from the engine 1, an ECU (Engine Control Unit) that drives and controls the engine 1, and the like, and outputs a frequency signal thereof. For example, in a case of a four-stroke cycle engine, when vibration to be controlled is caused by ignition of each cylinder, a frequency corresponding to rpm×number of cylinders/2 is obtained.

A target level storage section 31a stores a value of an excitation frequency and a value of a target vibration level, which is a vibration level to be reached, in association with each other in advance. A target level setting section 32a inputs information of the excitation frequency that is output by the excitation frequency detection section 37a, reads a target vibration level associated with the input excitation frequency from the target level storage section 31a, and outputs a target vibration level signal corresponding to the read target vibration level. Although the target level storage section 31a shown in FIG. 8 is a table in which the values of the excitation frequency and the target vibration level are associated with each other, the values are not limited to the excitation frequency and may be other values indicating a traveling state of the vehicle. For example, the table may be a table in which values of a traveling speed and values of the target vibration level are associated with each other. In this case, the target level setting section 32a may only need to input speed information of the vehicle instead of the excitation frequency.

A vibration level detection section 33a detects a vibration level from the signal output from the vibration detection section 5, and outputs a vibration level signal corresponding to the detected vibration level. The vibration level detection section 33a is constituted of an absolute value circuit 41a and a notch filter 42a. The absolute value circuit 41a calculates an absolute value of an input acceleration signal. The notch filter 42a inputs an output of the absolute value circuit 41a and a vibration control target frequency output from the excitation frequency detection section 37a and attenuates a frequency component twice as large as the vibration control target frequency. The notch filter 42a outputs a vibration level signal corresponding to the acceleration signal.

A comparison section 34a compares the size of the target vibration level signal output from the target level setting section 32a with that of the vibration level signal output from the vibration level detection section 33a, calculates a difference between the target vibration level signal and the vibration level signal, and sets a gain for a signal output by the band pass filter 52a. A vibration command generation section 35a inputs an output obtained by multiplying the output of the band pass filter 52a by a gain output from the comparison section 34a by a gain multiplication section 36a, and an excitation frequency, and generates a vibration command with which a vibration control force for changing the current vibration level into a target vibration level is generated, based on the difference between the target vibration level signal and the vibration level signal. The vibration command generation section 35a generates a vibration control force for reducing vibration so that the vibration level is changed into the target vibration level when the vibration level is larger than the target vibration level, and generates a vibration force so that the vibration level is changed into the target vibration level when the vibration level is smaller than the target vibration level.

The information stored in the target level storage section 31a shown in FIG. 8 has been described using FIG. 6 of the first embodiment described above.

Next, an operation of the control section 3 shown in FIG. 8 will be described. First, the absolute value circuit 41a inputs the output signal of the band pass filter 52a and outputs an absolute value signal. The notch filter 42a inputs this absolute value signal and the excitation frequency, attenuates only a predetermined frequency component, and outputs the resultant to the comparison section 34a. Accordingly, a signal corresponding to a vibration level at the present time is output from the notch filter 42a and input to the comparison section 34a.

On the other hand, the target level setting section 32a inputs information of the excitation frequency from the excitation frequency detection section 37a and identifies an excitation frequency at the present time. Then, the target level setting section 32a reads a target vibration level value that is associated with the identified excitation frequency from the target level storage section 31a. Subsequently, the target level setting section 32a outputs a target vibration level signal corresponding to the read target vibration level value to the comparison section 34a. The comparison section 34a outputs, to the gain multiplication section 36a, a difference signal that indicates a difference between the vibration level signal and target vibration level to be input. The gain multiplication section 36a multiplies the output of the band pass filter 52a (detected vibration signal) by a gain that is based on the difference signal output from the comparison section 34a, and outputs the resultant to the vibration command generation section 35a.

The vibration command generation section 35a obtains a vibration command to be generated, based on the excitation frequency and the vibration signal multiplied by the gain, the vibration signal being output from the gain multiplication section 36a, and outputs the vibration command to the amplifier 4. Accordingly, the vibration command generation section 35a outputs a command of a vibration control force for reducing vibration so that the vibration level is changed into the target vibration level by the actuator 10 when the vibration level signal is larger than the target vibration level signal. Further, the vibration command generation section 35a outputs a command of a vibration force for increasing vibration so that the vibration level is changed into the target vibration level by the actuator 10 when the vibration level is smaller than the target vibration level. Accordingly, the auxiliary mass 11 vibrates and a vibration control force (force with which vibration is reduced) or a vibration force (force with which vibration is increased) is generated, with the result that the vibration at a vibration control target position generated by the engine 1, which is detected by the accelerometer 5, is kept in the target vibration level.

Next, with reference to FIG. 9, an operation of the vibration command generation section 35a of FIG. 8 will be described. First, a sine-wave oscillator 351a inputs the excitation frequency from the excitation frequency detection section 37a and outputs a reference sine wave $\sin(\omega t)$ and a reference cosine wave $\cos(\omega t)$ from a reference angle $\omega t$ calculated based on the excitation frequency.

On the other hand, a signal of the excitation frequency component output from the band pass filter 52a ($A \sin(\omega t + \phi)$) is multiplied by a gain $-Ka(Lc-Lv)$ by the multiplier 36a and the signal thus obtained is individually multiplied by each of the reference sine wave $\sin(\omega t)$ and the reference cosine wave $\cos(\omega t)$. The respective multiplication results are integrated by integrators 352a and 353a. The output of the integrator 352a is multiplied by the reference cosine wave $\cos(\omega t)$, whereas the output of the integrator 353a is multiplied by the reference sine wave sin(ωt). The respective multiplication results are added to be output as a vibration control command. This value is amplified by the amplifier 4 and then output. In this case, the integrators 352a and 353a perform the integration operation on the multiplication values of the output of the multiplier 36a and the reference sine wave/cosine wave until the output of the multiplier 36a becomes 0. When a deviation between the target value and the vibration amplitude is 0 (Lc−Lv=0), the inputs to the integrators 352a and 353a become 0. Therefore, a steady state is obtained and the vibration amplitude becomes equal to the target value.

Figure 9:
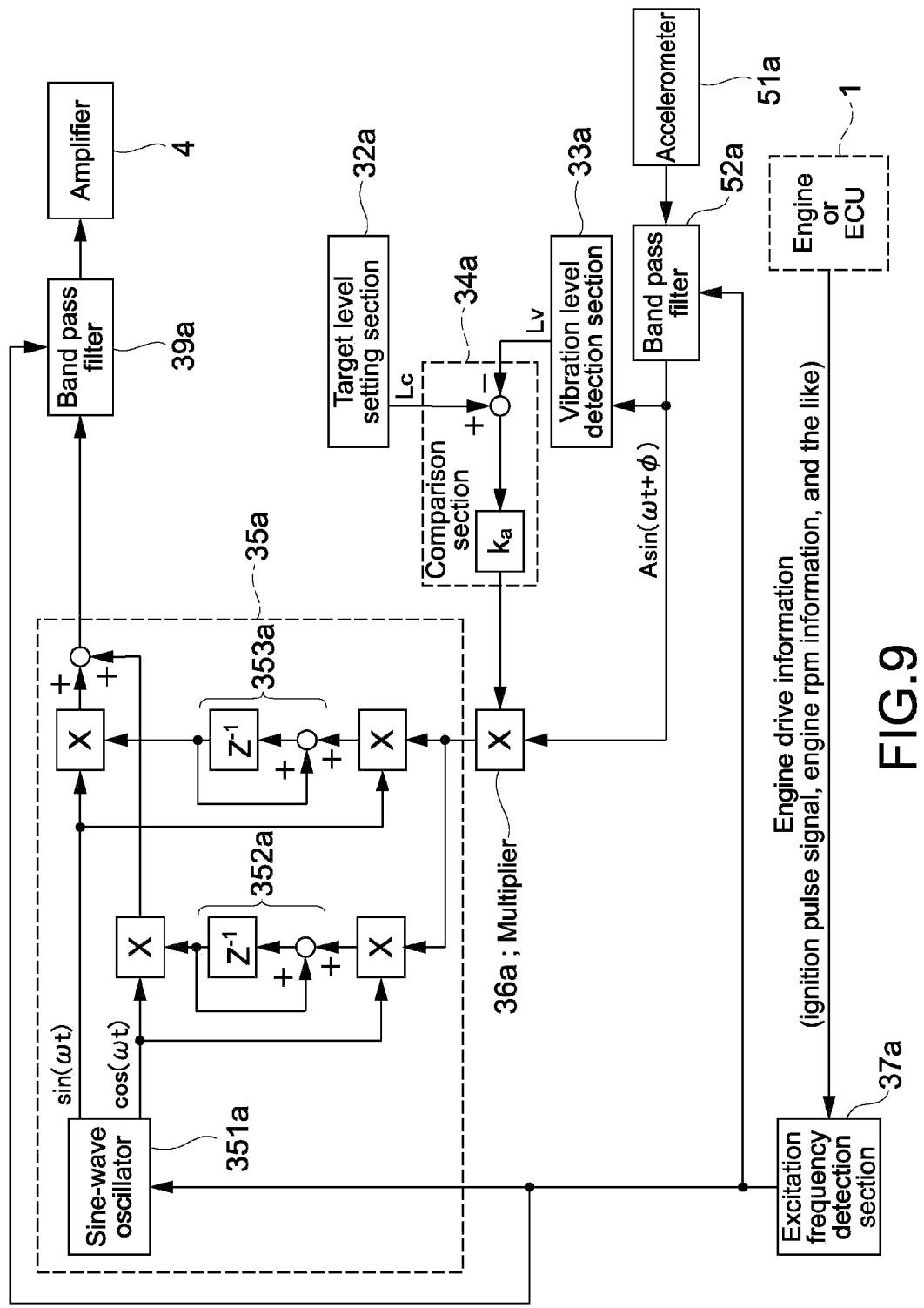
FIG. 9 is a block diagram showing a structure of a vibration command generation section 35a shown in FIG. 8.

It should be noted that in FIGS. 8 and 9, a band pass filter 39a is provided between the vibration command generation section 35a and the amplifier 4 (immediately before input to the amplifier 4). The band pass filter 39a is a filter that inputs the excitation frequency information output from the excitation frequency detection section 37a and passes only a frequency close to the excitation frequency. The object of the band pass filter 39a has been described in the first embodiment.

As a result of the comparison between the detected vibration level and the set target vibration level as described above, in a case where there is a difference between the vibration level and the target vibration level, the obtained amplitude component is multiplied by a predetermined gain, a vibration command of a vibration control force (or vibration force) to be generated by the vibration means is generated, and control is performed so that the vibration level is changed into the target vibration level by the vibration control force or vibration force to be generated. Therefore, it is possible to set a vibration level at a position of a vibration control target to a predetermined vibration level. Further, a vibration command of a vibration control force to be generated is generated by multiplication by a gain corresponding to the difference between the vibration level obtained based on the detected acceleration signal and the preset target vibration level. Therefore, the vibration command can be generated without performing a complicated operation or the like, and a circuit structure for generating a vibration control force or a vibration force can be made simple.

Figure 10:
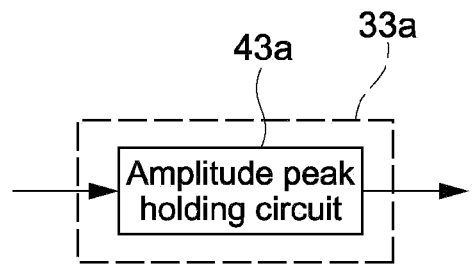
FIG. 10 is a block diagram showing a modified example of the vibration command generation section 35a shown in FIG. 8.

Next, with reference to FIGS. 10 to 14, modified examples of the vibration level detection section 33a shown in FIG. 8 will be described. FIG. 10 is a block diagram showing an example in which the vibration level detection section 33a shown in FIG. 8 is structured by an amplitude peak holding circuit 43a. The amplitude peak holding circuit 43a inputs an acceleration signal as an output of the band pass filter 52a and holds the peak of the acceleration signal for output. Accordingly, a vibration level signal as in the case of being structured by the absolute value circuit 41 and the notch filter 42a can be obtained.

Figure 11:
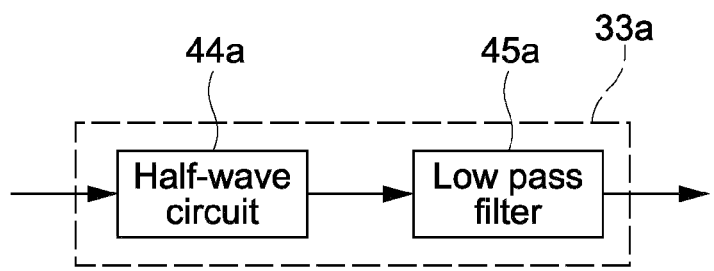
FIG. 11 is a block diagram showing a modified example of a vibration level detection section 33a shown in FIG. 8.

FIG. 11 is a block diagram showing an example in which the vibration level detection section 33a shown in FIG. 8 is structured by a half-wave circuit 44a and a low pass filter 45a. The half-wave circuit 44a inputs an acceleration signal as an output of the band pass filter 52a, and only a low frequency component of the output of the half-wave circuit 44a is caused to pass through the low pass filter 45a, with the result that a vibration level signal as in the case of being structured by the absolute value circuit 41a and the notch filter 42a can be obtained.

Figure 12:
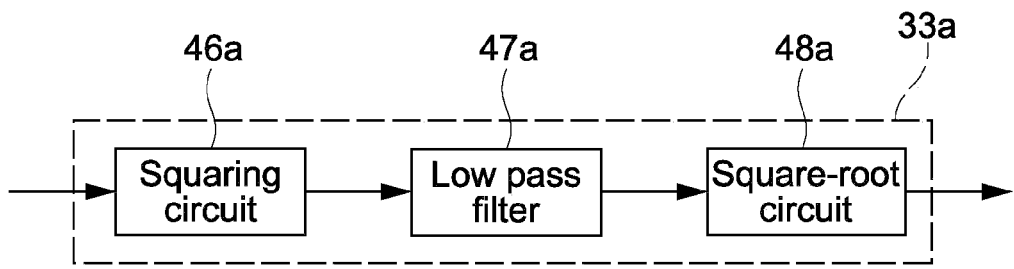
FIG. 12 is a block diagram showing a modified example of the vibration level detection section 33a shown in FIG. 8.

FIG. 12 is a block diagram showing an example in which the vibration level detection section 33a shown in FIG. 8 is structured by a squaring circuit 46a, a low pass filter 47a, and a square-root circuit 48a. The squaring circuit 46a inputs an acceleration signal as an output of the band pass filter 52a, only a low frequency component of the output of the squaring circuit 46a is caused to pass through the low pass filter 45a, and the signal thus obtained is caused to pass through the square-root circuit 48a, with the result that a vibration level signal as in the case of being structured by the absolute value circuit 41a and the notch filter 42a can be obtained.

Figure 13:
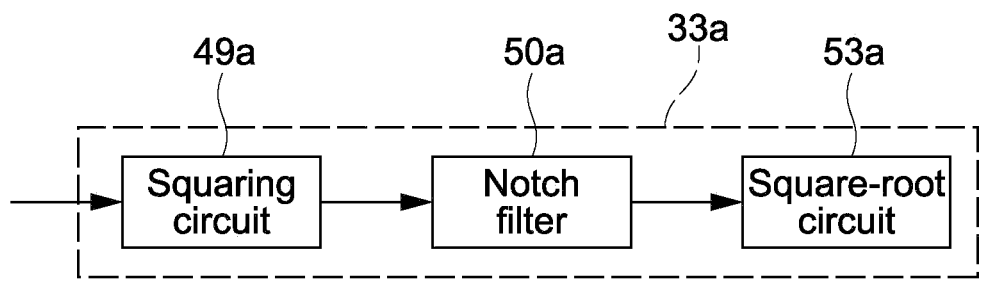
FIG. 13 is a block diagram showing a modified example of the vibration level detection section 33a shown in FIG. 8.

FIG. 13 is a block diagram showing an example in which the vibration level detection section 33a shown in FIG. 8 is structured by a squaring circuit 49a, a notch filter 50a, and a square-root circuit 53a. The squaring circuit 49a inputs an acceleration signal as an output of the band pass filter 52a, and the output of the squaring circuit 49a is caused to pass through the notch filter 50a and then through the square-root circuit 53a, with the result that a vibration level signal as in the case of being structured by the absolute value circuit 41a and the notch filter 42a can be obtained.

Figure 14:
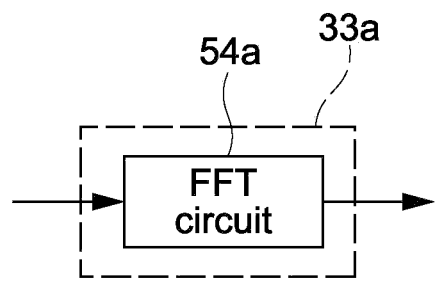
FIG. 14 is a block diagram showing a modified example of the vibration level detection section 33a shown in FIG. 8.

FIG. 14 is a block diagram showing an example in which the vibration level detection section 33a shown in FIG. 8 is structured by a FFT (Fast Fourier transform) circuit 54a. The FFT circuit 54a inputs an acceleration signal as an output of the band pass filter 52a and outputs a vibration level signal based on a result of extracting an amplitude component by the FFT processing, with the result that a vibration level signal as in the case of being structured by the absolute value circuit 41a and the notch filter 42a can be obtained.

Figure 15:
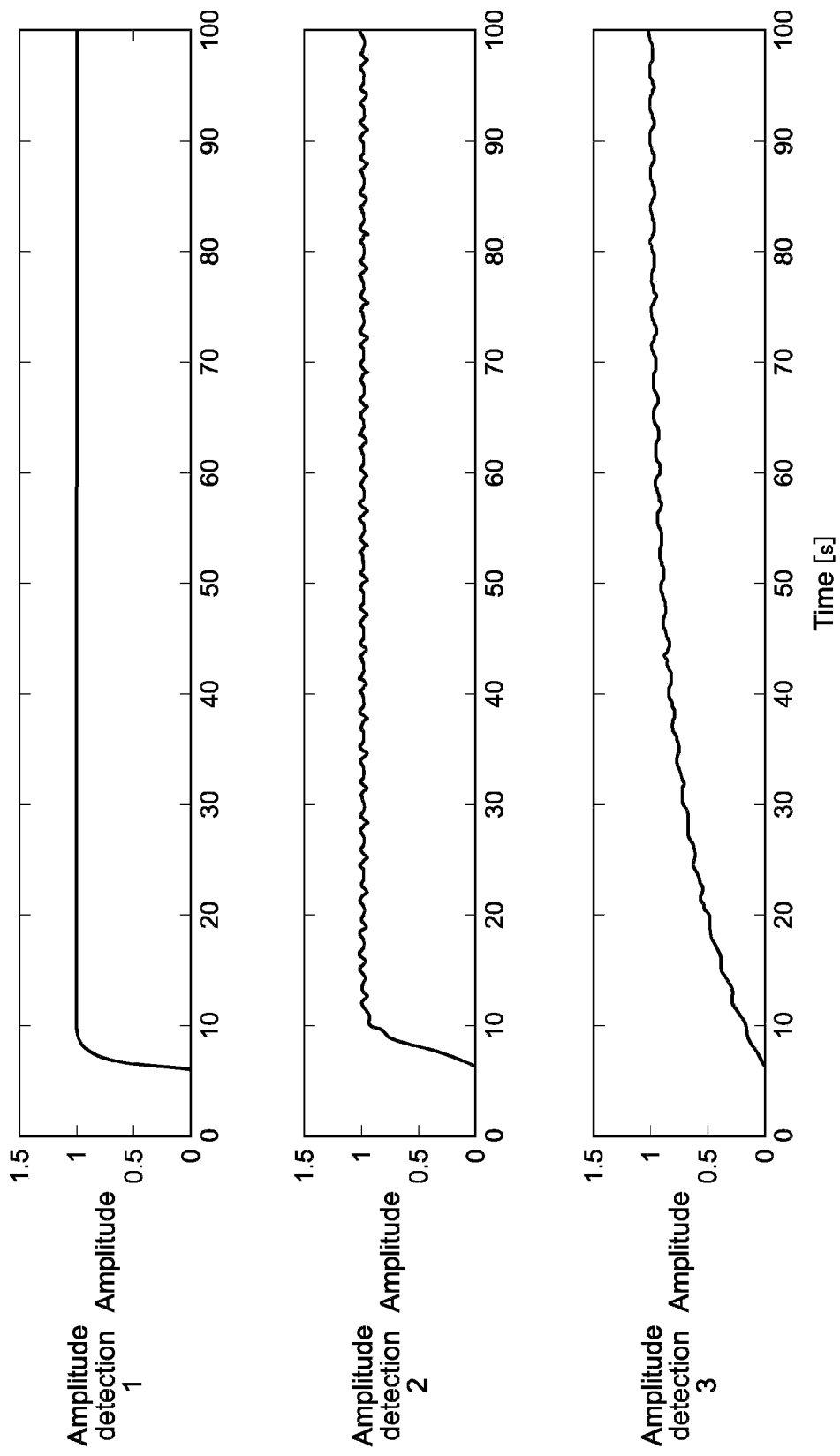
FIG. 15 is a diagram showing a difference in performance of a vibration level detection due to a difference in circuit structure.

Next, with reference to FIG. 15, a difference in performance of the vibration level detection due to the difference in circuit structure will be described. FIG. 15 is a diagram showing the response performance and detection accuracy of the vibration level detection due to the difference in circuit structure. In FIG. 15, amplitude detection 1 indicates a waveform of an output signal in a case where a sine-wave signal is input and caused to pass through a squaring circuit, a notch filter, and a square-root circuit sequentially. Further, amplitude detection 2 indicates a waveform of an output signal in a case where a sine-wave signal is input and caused to sequentially pass through an absolute value circuit and a notch filter (that is the same as the structure of the vibration level detection section 33a shown in FIG. 8). Further, amplitude detection 3 indicates a waveform of an output signal in a case where a sine-wave signal is input and caused to sequentially pass through an absolute value circuit and a low pass filter (circuit structure that can be structured most easily).

As shown in FIG. 15, it is found that as compared with the case where the vibration level detection is performed with the structure of the absolute value circuit and the low pass filter (amplitude detection 3), the detection responsiveness is excellent (rising is fast) and a pulsation can also be made small in the case of being structured by the squaring circuit, the notch filter, and the square-root circuit (amplitude detection 1) and the case of being structured by the absolute value circuit and the notch filter (amplitude detection 2).

Figure 16:
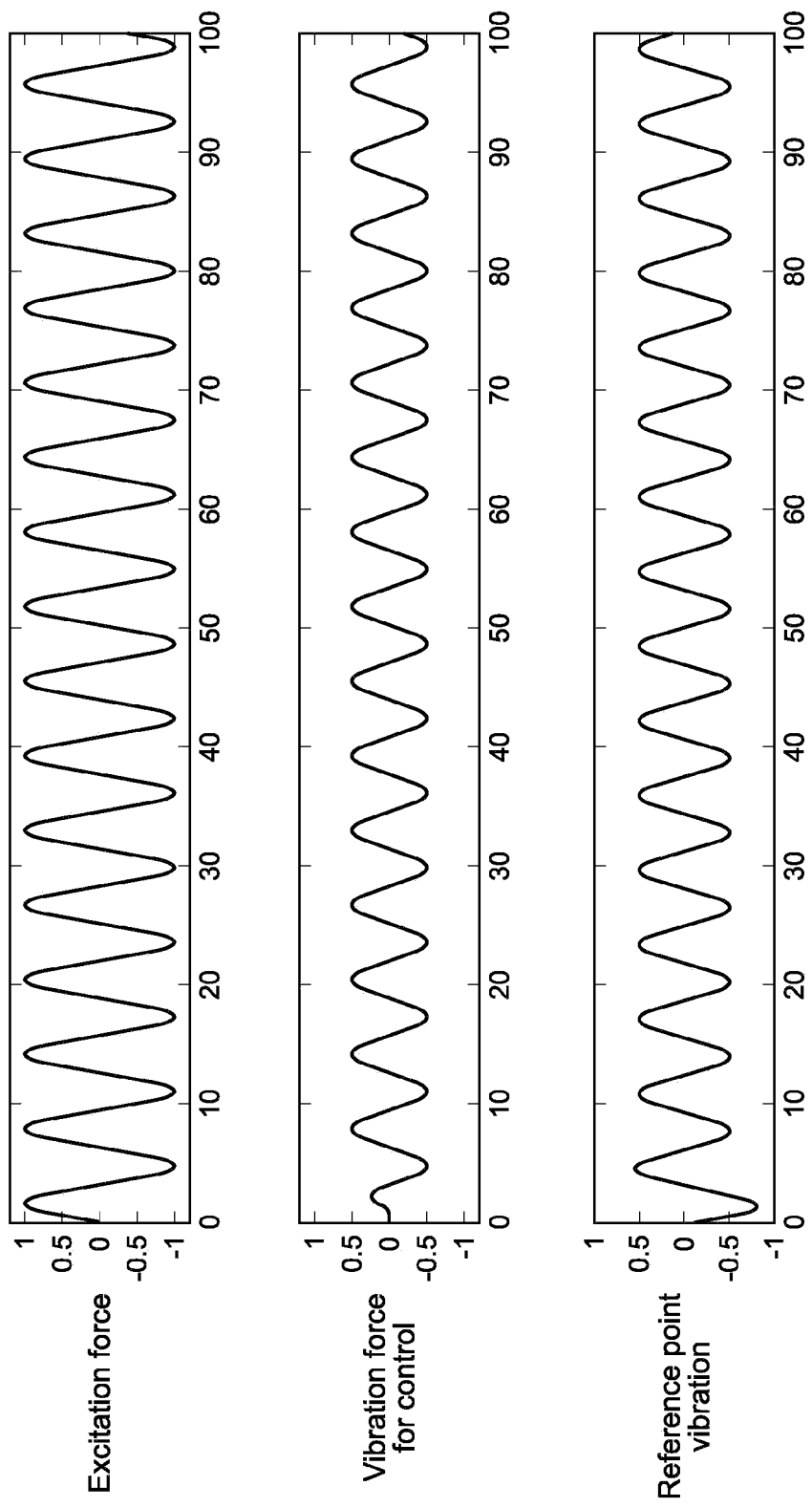
FIG. 16 is a diagram showing results obtained by simulating vibration control performance.
Figure 17:
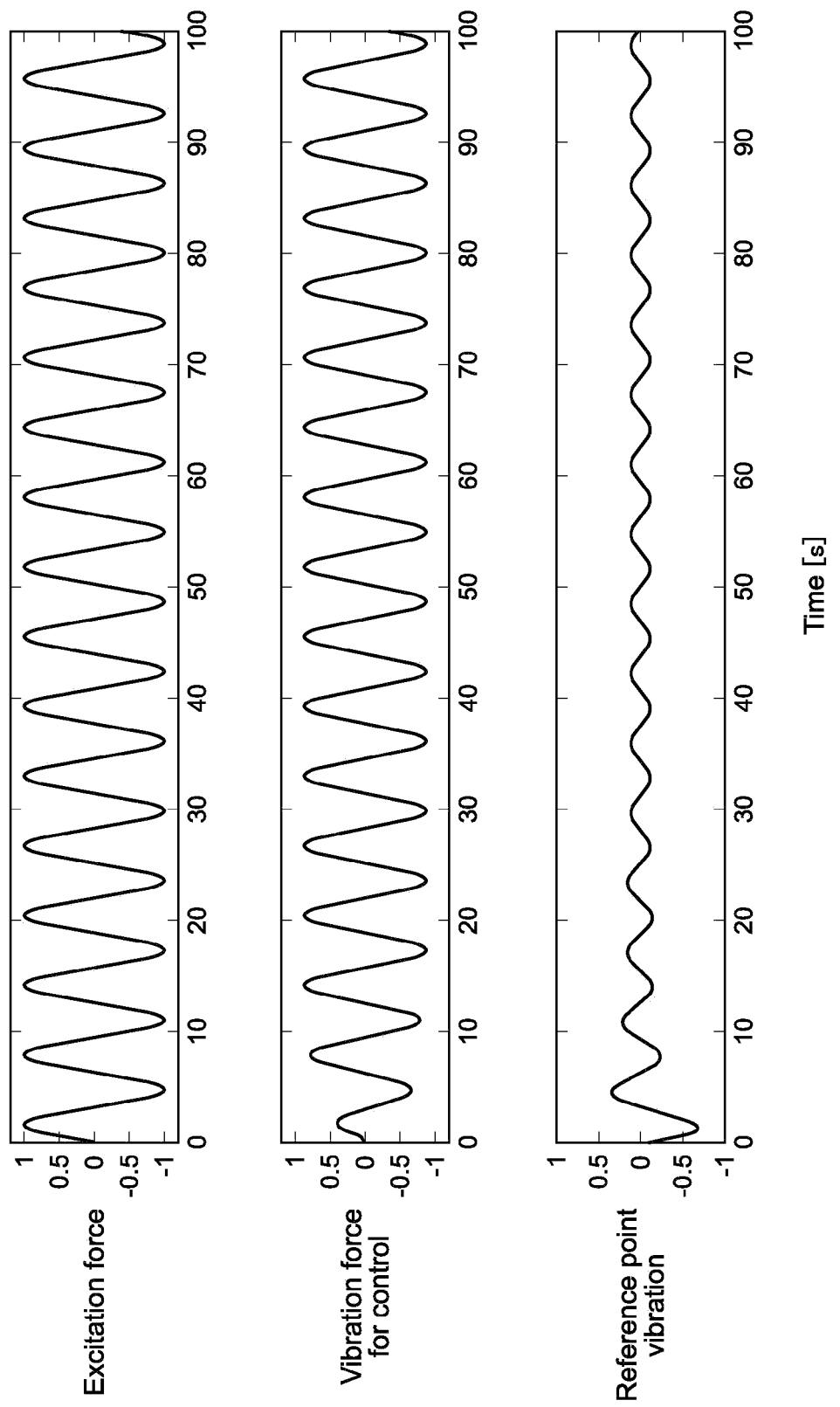
FIG. 17 is a diagram showing results obtained by simulating vibration control performance.

Next, with reference to FIGS. 16 and 17, results obtained by simulating the vibration control performance of the control section 3 shown in FIG. 8 will be described. FIGS. 16 and 17 are diagrams showing the vibration control performance when a predetermined excitation force (amplitude 1, frequency 1 rad/s) is acting and a force for controlling vibration control is given in a case where the target vibration level is set to 0.5. As shown in the reference point vibration of FIG. 16, it is found that the vibration is controlled so that the amplitude becomes 0.5. Further, FIG. 17 is a diagram showing the vibration control performance when a force for controlling vibration control is given in a case where the target vibration level is set to 0.1. As shown in the reference point vibration of FIG. 17, it is found that the vibration is controlled so that the amplitude becomes 0.1. It should be noted that the target vibration level is defined by a half amplitude value.

Figure 18:
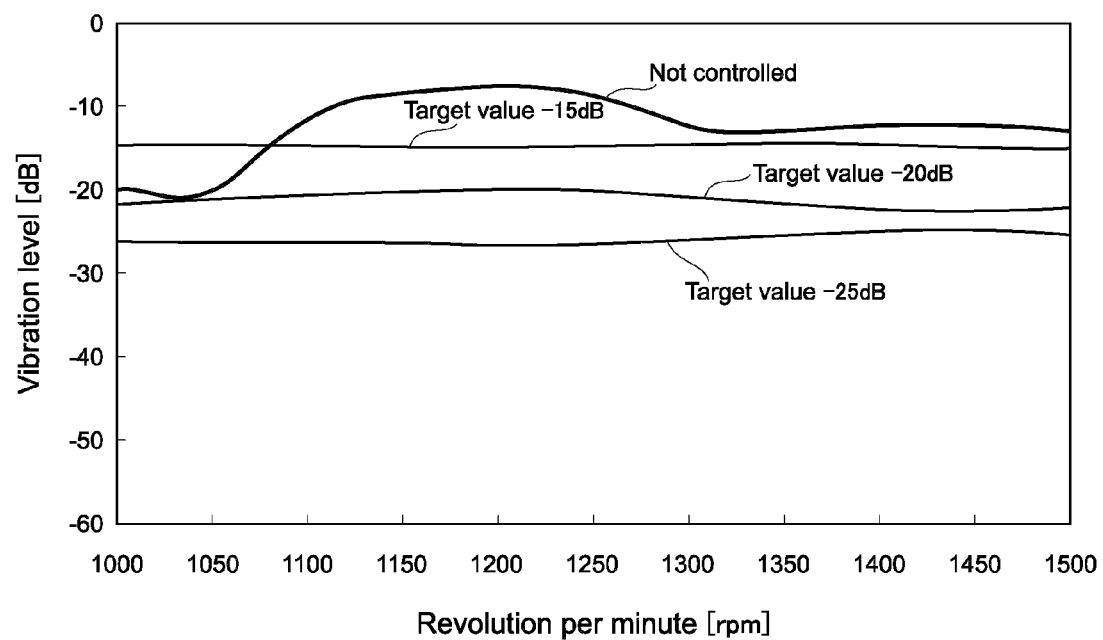
FIG. 18 is an explanatory diagram showing a relationship between a target vibration level and a vibration level.

As a result of the comparison between the detected vibration level and the set target vibration level as described above, a vibration control force for reducing vibration is generated so that the vibration level is changed into the target vibration level by the actuator 10 when the vibration level is larger than the target vibration level, and a vibration force for increasing vibration is generated so that the vibration level is changed into the target vibration level by the actuator 10 when the vibration level is smaller than the target vibration level, with the result that the vibration level at a position of a vibration control target can be set to a predetermined vibration level. As shown in FIG. 18, a vibration level of a vehicle body frame 2 of a vehicle without a vibration control device is determined based on the rigidity or the like of the vehicle body frame 2, so the vibration level does not have a proportional relationship with an engine rpm and is changed by the shape of the vehicle body frame 2 and characteristics of the engine 1. However, by providing the vibration control device described above according to the present invention, the vibration level generated in the vehicle body frame 2 can be changed into the target vibration level (for example, −15 dB, −20 dB, −25 dB), with the result that the control of keeping the level or the like can be performed irrespective of the rpm of the engine 1.

In addition, since the table that defines the relationship between the excitation frequency and the target vibration level stored in the target level storage section 31a is rewritable, it is possible to realize any vibration level in accordance with the shape of the vehicle body frame 2 and characteristics of the engine 1. Further, even when a vibration state generated in the vehicle is changed, the vibration is not always suppressed in a direction in which the vibration is reduced, but controlled so as to be kept in a predetermined target vibration level in accordance with a traveling state. Accordingly, the occupant can feel the traveling state of the vehicle that the occupant is driving and a change of vibration or sound accompanying the vibration, and can perform a drive operation without feeling a sense of discomfort. In addition, also in a case where operations of stopping a cylinder or switching to a motor are performed in order to improve fuel efficiency and an excitation force is changed, it is possible to arbitrarily set a target vibration level in accordance with the traveling state of the vehicle, with the result that the occupant can perform drive without feeling a sense of discomfort such as a change of vibration accompanying the switching. Further, the vibration is represented by a value of the level, with the result that it is possible to realize the vibration level detection with a simple circuit structure.

(Third Embodiment)

Next, a third embodiment of the present invention will be described.

The entire structure of this embodiment is the same as that of FIG. 1 and the structure of the actuator 10 therein is the same as that of FIG. 2, so description thereof will be omitted. This embodiment is different from the first embodiment and the second embodiment described above in the structure of the control section 3 in FIG. 1.

Figure 19:
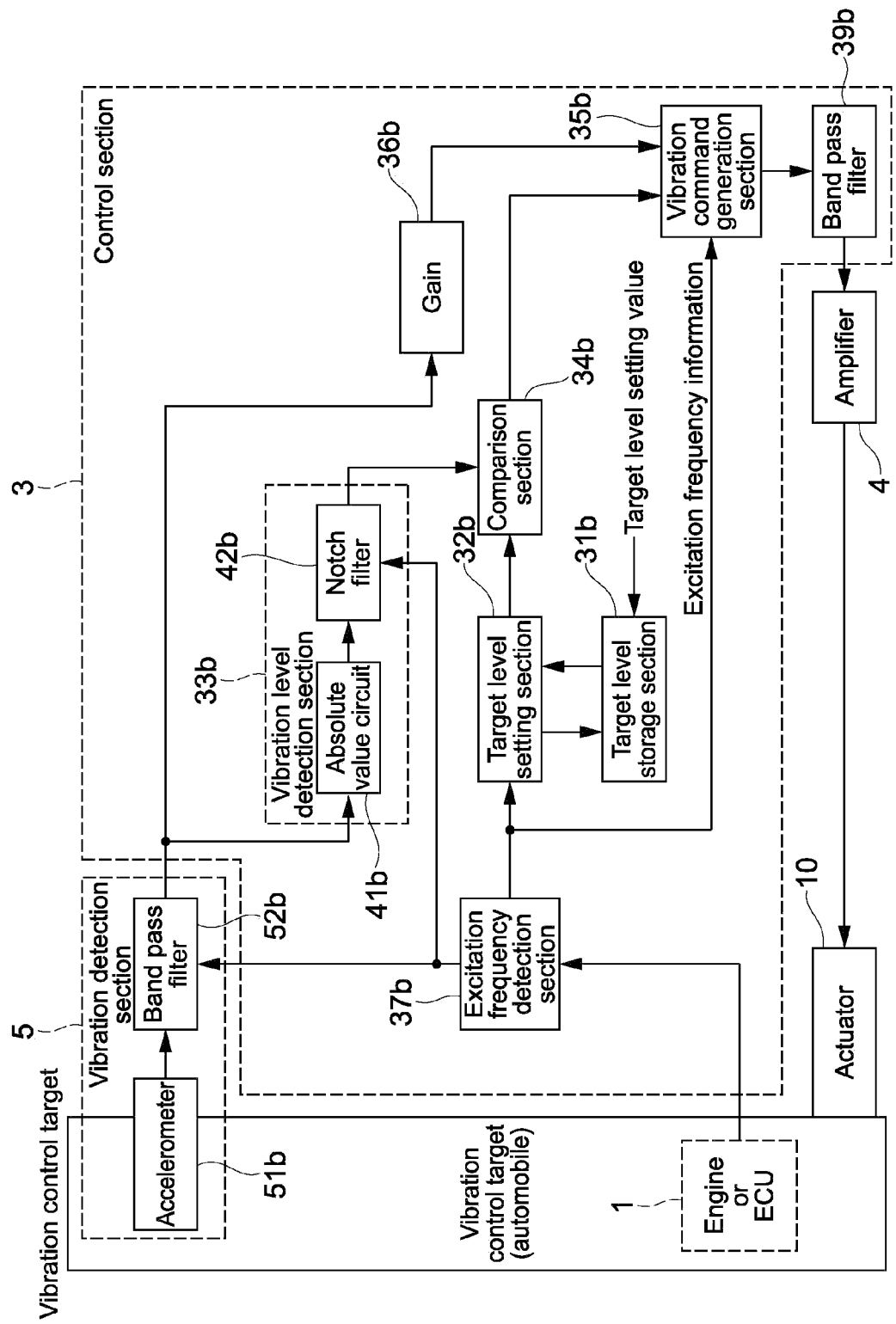
FIG. 19 is a block diagram showing a structure of a control section 3 of a third embodiment of the present invention.

FIG. 19 is a block diagram showing a structure of a control section 3 of this embodiment. In FIG. 19, an accelerometer 51b detects vibration at a position at which vibration is to be controlled. A band pass filter 52b causes only a frequency of a vibration control target to pass therethrough. The band pass filter 52b causes only a frequency component of the vibration control target to pass therethrough by inputting a vibration control target frequency that is output from an excitation frequency detection section 37b based on information related to an engine rpm, such as an ignition pulse signal output from the engine 1. The excitation frequency detection section 37b determines a frequency of vibration to be controlled (vibration control target frequency) based on the engine rpm information and the ignition pulse signal that are obtained by the engine 1, an ECU (Engine Control Unit) that drives and controls the engine 1, and the like, and outputs a frequency signal thereof. For example, in a case of a four-stroke cycle engine, when vibration to be controlled is caused by ignition of each cylinder, a frequency corresponding to rpm×number of cylinders/2 is obtained.

A target level storage section 31b stores a value of an excitation frequency and a value of a target vibration level, which is a vibration level to be reached, in association with each other in advance. A target level setting section 32b inputs information of the excitation frequency that is output by the excitation frequency detection section 37b, reads a target vibration level associated with the input excitation frequency from the target level storage section 31b, and outputs a target vibration level signal corresponding to the read target vibration level. Although the target level storage section 31b shown in FIG. 19 is a table in which the values of the excitation frequency and the target vibration level are associated with each other, the values are not limited to the excitation frequency and may be other values indicating a traveling state of the vehicle. For example, the table may be a table in which values of a traveling speed and values of the target vibration level are associated with each other. In this case, the target level setting section 32b may only need to input speed information of the vehicle instead of the excitation frequency.

A vibration level detection section 33b detects a vibration level from the signal output from the vibration detection section 5, and outputs a vibration level signal corresponding to the detected vibration level. The vibration level detection section 33b is constituted of an absolute value circuit 41b and a notch filter 42b. The absolute value circuit 41b calculates an absolute value of an input acceleration signal. The notch filter 42b inputs an output of the absolute value circuit 41b and a vibration control target frequency output from the excitation frequency detection section 37b and attenuates a frequency component twice as large as the vibration control target frequency. The notch filter 42b outputs a vibration level signal corresponding to the acceleration signal.

A comparison section 34b compares the size of the target vibration level signal output from the target level setting section 32b with that of the vibration level signal output from the vibration level detection section 33b, and outputs a comparison result in which a difference between the target vibration level signal and the vibration level signal is calculated. A vibration command generation section 35b inputs an output obtained by multiplying the output of the band pass filter 52b by a gain −2μ by a gain multiplication section 36b, an excitation frequency, and the output of the comparison section 34b, and generates a vibration command with which a vibration control force for changing the current vibration level into a target vibration level is generated. The vibration command generation section 35b generates a vibration control force for reducing vibration so that the vibration level is changed into the target vibration level when the vibration level is larger than the target vibration level, and generates a vibration force so that the vibration level is changed into the target vibration level when the vibration level is smaller than the target vibration level.

The information stored in the target level storage section 31b shown in FIG. 19 has been described using FIG. 6 of the first embodiment described above.

Next, an operation of the control section 3 shown in FIG. 19 will be described. First, the absolute value circuit 41b inputs the output signal of the band pass filter 52b and outputs an absolute value signal. The notch filter 42b inputs this absolute value signal and the excitation frequency, attenuates only a predetermined frequency component, and outputs the resultant to the comparison section 34b. Accordingly, a vibration level signal at the present time is output from the notch filter 42b and input to the comparison section 34b.

On the other hand, the target level setting section 32b inputs information of the excitation frequency from the excitation frequency detection section 37b and identifies an excitation frequency at the present time. Then, the target level setting section 32b reads a target vibration level value that is associated with the identified excitation frequency from the target level storage section 31b. Subsequently, the target level setting section 32b outputs a target vibration level signal corresponding to the read target vibration level value to the comparison section 34b. The comparison section 34b outputs, to the vibration command generation section 35b, a difference signal that indicates a difference between the vibration level signal and target vibration level to be input. The gain multiplication section 36b multiplies the output of the band pass filter 52b (detected vibration signal) by a gain $-2\mu$, and outputs the resultant to the vibration command generation section 35b.

The vibration command generation section 35b obtains a vibration command to be generated, based on the vibration signal multiplied by the gain, the vibration signal being output from the gain multiplication section 36b, the comparison signal output from the comparison section 34b, and the excitation frequency, and outputs the vibration command to the amplifier 4. Accordingly, the vibration command generation section 35b outputs a command of a vibration control force for reducing vibration so that the vibration level is changed into the target vibration level by the actuator 10 when the vibration level signal is larger than the target vibration level signal. Further, the vibration command generation section 35b outputs a command of a vibration force for increasing vibration so that the vibration level is changed into the target vibration level by the actuator 10 when the vibration level is smaller than the target vibration level. Accordingly, the auxiliary mass 11 vibrates and a vibration control force (force with which vibration is reduced) or a vibration force (force with which vibration is increased) is generated, with the result that the vibration generated by the engine 1, which is detected by the accelerometer 5, is kept in the target vibration level.

Next, with reference to FIG. 20, a detailed structure and operation of the vibration command generation section 35b will be described. First, a sine-wave oscillator 351b inputs the excitation frequency from the excitation frequency detection section 37b and outputs a reference sine wave $\sin(\omega t)$ and a reference cosine wave $\cos(\omega t)$ from a reference angle $\omega t$ generated from the excitation frequency.

Then, a signal of a frequency component of the excitation force output from the band pass filter 52b ($A \sin(\omega t+\phi)$) is multiplied by a gain $-2\mu$ by the multiplier 36b and the signal thus obtained is individually multiplied by each of the reference sine wave $\sin(\omega t)$ and the reference cosine wave $\cos(\omega t)$. The respective multiplication results are integrated by integrators 352b and 353b. The output of the integrator 352b is multiplied by the reference cosine wave $\cos(\omega t)$, whereas the output of the integrator 353b is multiplied by the reference sine wave $\sin(\omega t)$. The respective multiplication results are added to be output as a vibration control command. This value is amplified by the amplifier 4 and then output. In this case, the integrators 352b and 353b perform the integration operation on the multiplication values of the output of the multiplier 36b and the reference sine wave/cosine wave until the output of the multiplier 36b becomes 0 (that is, until the vibration amplitude A becomes equal to 0). Then, feedback signals in the integrators 352b and 353b are multiplied, by multipliers 354b and 355b, by a signal multiplied by the amplitude of the vibration, a ratio of the difference with the target value to the target value (Lv−Lc)/Lc, and an adjustment gain Ka.

Accordingly, in the case where the vibration level is smaller than the target vibration level, a signal obtained by adding products of the outputs of the integrators 352b and 353b and the reference sine wave and reference cosine wave is output as a vibration command for increasing vibration. In addition, in the case where the vibration amplitude is larger than the target value, the outputs of the integrators are output so as to suppress vibration. The signal obtained by adding the products of the outputs of the integrators and the reference sine wave and reference cosine wave is output as a vibration command for suppressing vibration. As a result, the vibration is kept in the target level.

Figure 20:
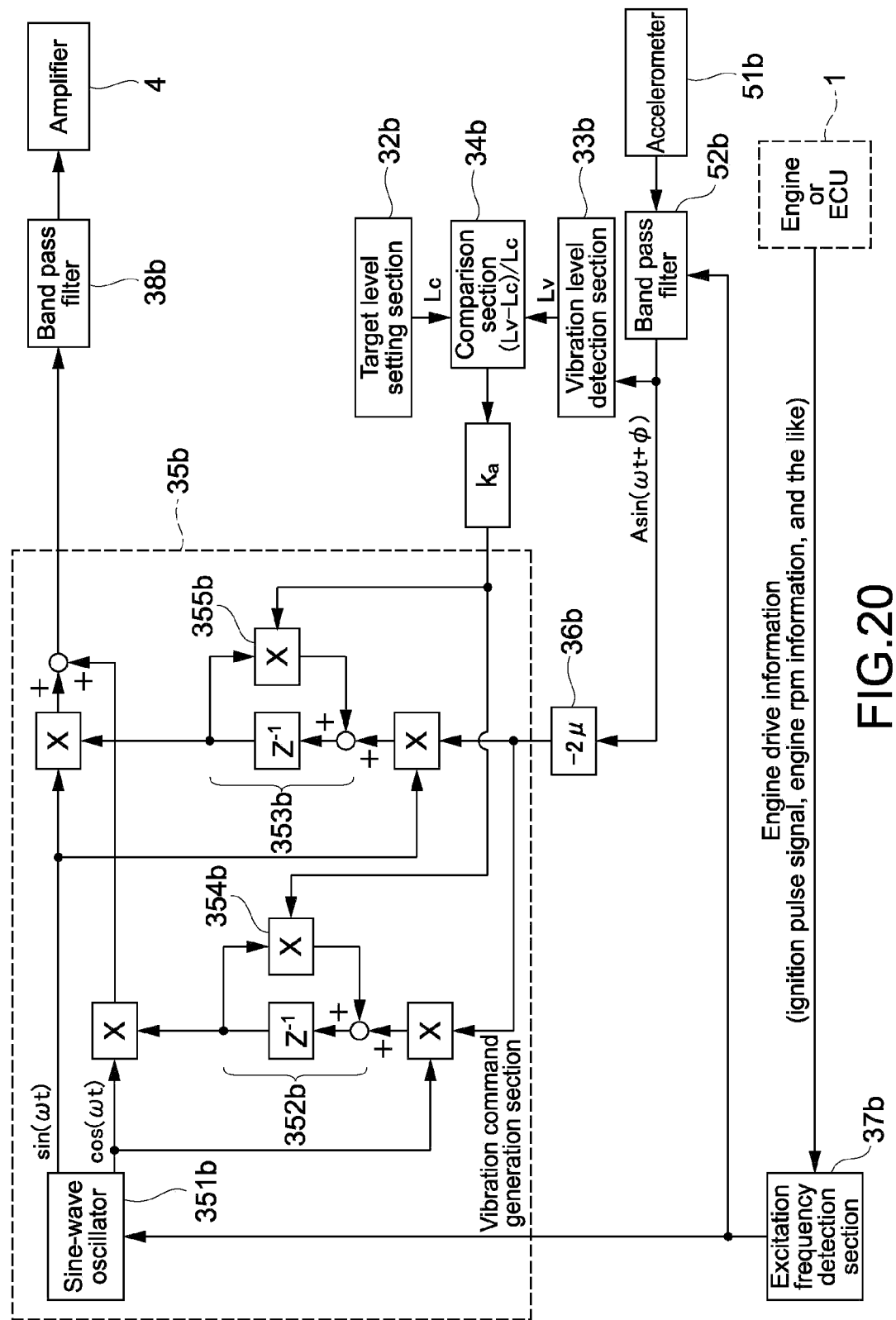
FIG. 20 is a block diagram showing a structure of a vibration command generation section 35b shown in FIG. 19.

It should be noted that in FIGS. 19 and 20, a band pass filter 39b is provided between the vibration command generation section 35b and the amplifier 4 (immediately before input to the amplifier 4). The band pass filter 39b is a filter that inputs the excitation frequency information output from the excitation frequency detection section 37b and passes only a frequency close to the excitation frequency. The object of the band pass filter 39b has been described in the first embodiment.

As a result of the comparison between the detected vibration level and the set target vibration level as described above, when the vibration level is larger than the target vibration level, a current limit value is set to be small so that a vibration control force for suppressing vibration is generated so that the vibration level is changed into the target vibration level by the actuator 10, and when the vibration level is smaller than the target vibration level, a current limit value is set to be large so that a vibration control force for generating vibration is generated so that the vibration level is changed into the target vibration level by the actuator 10, with the result that the vibration level at a position of a vibration control target can be set to a predetermined vibration level.

In addition, since the table that defines the relationship between the engine rpm and the target vibration level stored in the target level storage section 31b is rewritable, it is possible to realize any vibration level in accordance with the shape of the vehicle body frame 2 and characteristics of the engine 1. Further, even when a vibration state generated in the vehicle is changed, the vibration is not always suppressed in a direction in which the vibration is reduced, but controlled so as to be kept in a predetermined target vibration level. Accordingly, the occupant can grasp the state of the vehicle that the occupant is driving from a change of vibration or sound accompanying the vibration, and can perform a drive operation without feeling a sense of discomfort. In addition, also in a case where operations of stopping a cylinder or switching to a motor are performed in accordance with the traveling state in order to improve fuel efficiency, it is possible to arbitrarily set a target vibration level in accordance with the traveling state of the vehicle, not merely performing control of suppressing vibration so as to keep the vibration in a low level. As a result, it is possible to reproduce a vibration level to an extent that the traveling state of the vehicle can be felt while suppressing the vibration of the vehicle in a low level as a whole. Further, the vibration is represented by a value of the level, with the result that it is possible to realize the vibration level detection with a simple circuit structure. In addition, since the vibration command to be generated is generated by changing a current limit value with respect to the actuator 10, a vibration wave signal can be generated without performing a complicated operation or the like and the circuit structure of the control section 3 can be made simple.

It should be noted that in the description of the embodiments described above, the linear actuator 10 shown in FIG. 2 has been described as one that generates a vibration control force, but any means for vibrating the auxiliary mass 11 may be used as long as it is a drive source that can generate a reaction force with which vibration can be suppressed by vibrating the auxiliary mass 11. Further, although the example in which the linear actuator 10 is provided at a position different from the position of the vibration control target has been described in the description above, the linear actuator 10 may be provided at a position that is the same as the position of the vibration control target.

INDUSTRIAL APPLICABILITY

The vibration control device according to the present invention can be applied for the use of suppressing vibration in a case where a position at which vibration is to be suppressed and a position at which a vibration control force is generated are different. Further, although the vibration control target has been described as a vehicle body frame of an automobile in the description above, a vibration control target unit of the vibration control device of the present invention is not necessarily a vehicle body frame of an automobile, and may be a component part of an automobile such as a wheel, or a vehicle body of an autonomous vehicle, a robot arm, or the like other than automobiles.

The invention claimed is:

1. A vibration control device, comprising:
   a frequency detection means for detecting a frequency of vibration arising from a vibration generation source;
   a vibration detection means for detecting vibration of a frequency that is equal to the frequency of the vibration arising from the vibration generation source that is detected by the frequency detection means at a position at which vibration is to be controlled;
   a vibration level conversion means for converting the detected vibration into a vibration level;
   a vibration means provided at a position that is different from or the same as the position at which vibration is to be controlled, for generating a vibration control force with which the position at which vibration is to be controlled is vibrated;
   a comparison means for comparing the vibration level with a predetermined target vibration level; and
   a vibration command generation means for generating, based on a comparison result obtained by the comparison means, a vibration command for reducing vibration so that the vibration level is changed into the target vibration level in a case where the vibration level is larger than the target vibration level, and outputting the generated vibration command to the vibration means.

2. The vibration control device according to claim 1, wherein the vibration command generation means generates, based on the comparison result obtained by the comparison means, the vibration command for reducing vibration so that the vibration level is changed into the target vibration level in the case where the vibration level is larger than the target vibration level, or a vibration command for increasing vibration so that the vibration level is changed into the target vibration level in a case where the vibration level is smaller than the target vibration level, and outputting the generated vibration command to the vibration means.

3. The vibration control device according to claim 1, wherein the vibration command generation means generates the vibration command by multiplying a signal output by the vibration detection means by a gain generated based on the comparison result obtained by the comparison means.

4. The vibration control device according to claim 3, wherein the vibration level conversion means converts the vibration detected by the vibration detection means into the vibration level through an absolute value circuit and a notch filter that attenuates a frequency component twice as large as the frequency of vibration to be controlled.

5. The vibration control device according to claim 1, wherein the vibration means is attached to a vehicle body frame of a vehicle.

6. A vehicle, comprising the vibration control device according to any one of claims 1 to 5.

7. A vibration control device, comprising:
   a frequency detection means for detecting a frequency of vibration arising from a vibration generation source;
   a vibration detection means for detecting vibration of a frequency that is equal to the frequency of the vibration arising from the vibration generation source that is detected by the frequency detection means at a position at which vibration is to be controlled;
   a vibration level conversion means for converting the detected vibration into a vibration level;
   a vibration means provided at a position that is different from or the same as the position at which vibration is to be controlled, for generating a vibration control force with which the position at which vibration is to be controlled is vibrated;
   a comparison means for comparing the vibration level with a predetermined target vibration level; and
   a vibration command generation means for generating, as a result of the comparison made by the comparison means, in a case where the vibration level is different from the target vibration level, a vibration command for reducing or increasing vibration so that the vibration level is changed into the target vibration level by changing a gain based on a result of the comparison between the target vibration level and the vibration level, and outputting the generated vibration command to the vibration means.

8. The vibration control device according to claim 7, wherein the vibration means is attached to a vehicle body frame of a vehicle.

9. A vehicle, comprising the vibration control device according to any one of claims 7 and 8.

* * * * *